United States Patent
Dobbs et al.

(10) Patent No.: US 10,838,787 B2
(45) Date of Patent: Nov. 17, 2020

(54) PROCESSING SYSTEM WITH INTERSPERSED PROCESSORS WITH MULTI-LAYER INTERCONNECT

(71) Applicant: Coherent Logix, Incorporated, Austin, TX (US)

(72) Inventors: Carl S. Dobbs, Austin, TX (US);
Michael R. Trocino, Austin, TX (US);
Michael B. Solka, Austin, TX (US)

(73) Assignee: Coherent Logix, Incorporated, Austin, TX (US)

( * ) Notice: Subject to any disclaimer, the term of this patent is extended or adjusted under 35 U.S.C. 154(b) by 0 days.

(21) Appl. No.: 16/713,812

(22) Filed: Dec. 13, 2019

(65) Prior Publication Data
US 2020/0117521 A1    Apr. 16, 2020

Related U.S. Application Data

(63) Continuation of application No. 16/252,904, filed on Jan. 21, 2019, now Pat. No. 10,521,285, which is a
(Continued)

(51) Int. Cl.
*G06F 13/40*       (2006.01)
*G06F 9/54*        (2006.01)
(Continued)

(52) U.S. Cl.
CPC .......... *G06F 9/546* (2013.01); *G06F 9/44505* (2013.01); *G06F 13/1673* (2013.01);
(Continued)

(58) Field of Classification Search
None
See application file for complete search history.

(56) References Cited

U.S. PATENT DOCUMENTS 5,249,292 A * 9/1993 Chiappa ................. H04L 29/06
                                                        370/392
6,363,411 B1    3/2002 Dugan
(Continued)

FOREIGN PATENT DOCUMENTS

WO    2004/003781 A2    1/2004

OTHER PUBLICATIONS

International Search Report and Written Opinion for Application No. PCT/US2013/034125, dated Oct. 10, 2013 (5 pages).
(Continued)

*Primary Examiner* — Michael Sun
(74) *Attorney, Agent, or Firm* — Kowert, Hood, Munyon, Rankin & Goetzel, P.C.

(57) ABSTRACT

Embodiments of a multi-processor array are disclosed that may include a plurality of processors and configurable communication elements coupled together in a interspersed arrangement. Each configurable communication element may include a local memory and a plurality of routing engines. The local memory may be coupled to a subset of the plurality of processors. Each routing engine may be configured to receive one or more messages from a plurality of sources, assign each received message to a given destination of a plurality of destinations dependent upon configuration information, and forward each message to assigned destination. The plurality of destinations may include the local memory, and routing engines included in a subset of the plurality of configurable communication elements.

20 Claims, 26 Drawing Sheets

Related U.S. Application Data continuation of application No. 15/986,701, filed on May 22, 2018, now Pat. No. 10,185,608, which is a continuation of application No. 15/631,925, filed on Jun. 23, 2017, now Pat. No. 9,990,241, which is a continuation of application No. 15/219,095, filed on Jul. 25, 2016, now Pat. No. 9,720,867, which is a continuation of application No. 13/851,683, filed on Mar. 27, 2013, now Pat. No. 9,430,422.

(60) Provisional application No. 61/728,959, filed on Nov. 21, 2012.

(51) Int. Cl.
  *G06F 15/80* (2006.01)
  *G06F 13/28* (2006.01)
  *G06F 15/76* (2006.01)
  *G06F 13/16* (2006.01)
  *G06F 9/445* (2018.01)
  *G06F 13/42* (2006.01)

(52) U.S. Cl.
  CPC .......... *G06F 13/28* (2013.01); *G06F 13/4022* (2013.01); *G06F 13/4027* (2013.01); *G06F 13/4282* (2013.01); *G06F 15/76* (2013.01); *G06F 15/8038* (2013.01); *Y02D 10/14* (2018.01); *Y02D 10/151* (2018.01)

(56) References Cited

U.S. PATENT DOCUMENTS

| | | | |
|---|---|---|---|
| 7,415,594 B2 | 8/2008 | Doerr | |
| 7,756,027 B1* | 7/2010 | Reddy | H04L 41/0806 370/230 |
| 8,473,818 B2 | 6/2013 | Mangione-Smith | |
| 2002/0061012 A1 | 5/2002 | Thi | |
| 2002/0078277 A1 | 6/2002 | Mohindra | |
| 2003/0189930 A1 | 10/2003 | Terrell | |
| 2004/0030859 A1 | 2/2004 | Doerr | |
| 2004/0114626 A1 | 6/2004 | Cline | |
| 2004/0167964 A1 | 8/2004 | Rounthwaite | |
| 2005/0018612 A1 | 1/2005 | Fitzgerald | |
| 2005/0152399 A1 | 7/2005 | Chu | |
| 2006/0179487 A1 | 8/2006 | Hatakeyama | |
| 2007/0143578 A1* | 6/2007 | Horton | H04L 49/1507 712/11 |
| 2008/0159150 A1 | 7/2008 | Ansari | |
| 2009/0005964 A1* | 1/2009 | Forstall | G01C 21/3492 701/533 |
| 2009/0063728 A1 | 3/2009 | Arimilli | |
| 2009/0113171 A1 | 4/2009 | Herrell | |
| 2009/0190600 A1 | 7/2009 | Akahane | |
| 2011/0138059 A1 | 6/2011 | Schleifer | |
| 2011/0261816 A1 | 10/2011 | Morris | |
| 2011/0264905 A1* | 10/2011 | Ovsiannikov | H04L 63/168 713/151 |
| 2012/0131309 A1* | 5/2012 | Johnson | G06F 15/80 712/41 |
| 2012/0137119 A1 | 5/2012 | Doerr | |
| 2016/0344667 A1 | 11/2016 | Lane | |

OTHER PUBLICATIONS

Wilkinson "On Crossbar Switch and Multiple Bus Interconnection Networks with Overlapping Connectivity" IEEE Transactions on Computers, vol. 41, No. 6, Jun. 1992, pp. 738-746, New York, US (9 pages).

European Search Report, Application No. EP16196289.9-1954, dated Jan. 23, 2017 (7 pages).

* cited by examiner

| Port A Req | Port B Req | Crossbar Result | Port Result |
|---|---|---|---|
| Local | Local | Straight | A local / B stall |
| Local | Global | Straight | A local / B global |
| Global | Local | Cross | A global / B local |
| Global | Global | Straight | A global / B global |
| Local | - | Straight | A local |
| Global | - | Cross | A global |
| - | Local | Cross | B local |
| - | Global | Straight | B global |

*FIG. 9*

|     | C-D | H-T | | | | | |
|-----|-----|-----|---|---|---|---|---|
| (a) | C-D | H-T | HN4 | HN3 | HN2 | HN1 | HN0 |
| (b) | C-D | H-T | ZEROS | HN4 | HN3 | HN2 | HN1 |
| (c) | C-D | H-T | ZEROS | ZEROS | HN4 | HN3 | HN2 |
| (d) | C-D | H-T | ZEROS | ZEROS | ZEROS | HN4 | HN3 |
| (e) | C-D | H-T | ZEROS | ZEROS | ZEROS | ZEROS | HN4 |

FIG. 17

PROCESSING SYSTEM WITH INTERSPERSED PROCESSORS WITH MULTI-LAYER INTERCONNECT

PRIORITY INFORMATION

This application is a continuation of U.S. patent application Ser. No. 16/252,904 entitled "Processing System With Interspersed Processors With Multi-Layer Interconnection" and filed on Jan. 21, 2019, which is a continuation of U.S. patent application Ser. No. 15/986,701 entitled "Processing System With Interspersed Processors With Multi-Layer Interconnection" and filed on May 22, 2018, now U.S. Pat. No. 10,185,608, which is a continuation of U.S. patent application Ser. No. 15/631,925 entitled "Processing System With Interspersed Processors With Multi-Layer Interconnection" and filed on Jun. 23, 2017, now U.S. Pat. No. 9,990,241, which is a continuation of U.S. patent application Ser. No. 15/219,095 filed on Jul. 25, 2016, now U.S. Pat. No. 9,720,867, which is a continuation of U.S. patent application Ser. No. 13/851,683 filed on Mar. 27, 2013, now U.S. Pat. No. 9,430,422, which claims priority to U.S. Provisional Patent Application No. 61/728,959 filed Nov. 21, 2012, and which are all hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is, therefore, advised that any such previous disclaimer and the cited references that it was made to avoid, may need to be revisited. Further, any disclaimer made in the instant application should not be read into or against the parent application or other related applications.

BACKGROUND

Technical Field

This invention relates to computer systems and digital signal processors (DSP), and more particularly, to multi-processor systems.

Description of the Related Art

The need for parallel computation arises from the need to perform software tasks with increased speed. Parallel computation may accelerate the processing of multiple complex signals in applications such as telecommunications, remote sensing, radar, sonar, video, cinema, and medical imaging, and the like. Parallel computation also may provide greater computational throughput and may overcome certain limitations of the serial computation approach. The capability of computational systems may be compared by metrics of performance, usually for a set of specified test algorithms. The main performance metric of interest has been calculations per second. For battery-powered or thermally constrained equipment, however, the metric of calculations per second divided by the energy consumed may be preferred.

A parallel computer or signal processor, considered in the abstract, may be composed of multiple processors, multiple memories, and one or more interconnecting communication networks. These components have been combined in many different topologies, described in the literature on parallel-processor computing, also known as multiprocessing. All of these components have input to output latency due to internal delays that are related to electrical charge and discharge of conductor traces (wires) and transmission line effects, one of which is that no signal may travel faster than the speed of light. Consequently, smaller components generally exhibit lower latency than physically larger ones, and systems with fewer components will exhibit lower average latency than systems with more computational components. Although more components in the system may increase average latency, there are techniques of arranging computations to take advantage of low-latency communication between neighboring elements, such as pipeline and systolic processing.

In recent years advances in integrated circuit manufacturing have made it possible to fabricate increasingly miniaturized components of parallel computers. With miniaturization the components operate at lower power consumption, higher speed, and lower latency. Consequently hundreds of processing elements (PEs) and supporting memories (SM) along with a high bandwidth interconnection network (IN) may be fabricated on a single multiprocessor IC chip. From such multiprocessor chips a wide variety of parallel computer systems can be built—ranging from small systems using part of a chip to multichip systems that include high speed and high capacity memory chips.

Increasingly, digital electronic systems, such as computers, digital signal processors (DSP), and systems embedded in enclosing equipment, utilize one or more multi-processor arrays (MPAs). An MPA may be loosely defined as a plurality of processing elements (PEs), supporting memory (SM), and a high bandwidth interconnection network (IN). As used herein, the term "processing element" refers to a processor or CPU (central processing unit), microprocessor, or a processor core. The word array in MPA is used in its broadest sense to mean a plurality of computational units (each containing processing and memory resources) interconnected by a network with connections available in one, two, three, or more dimensions, including circular dimensions (loops or rings). Note that a higher dimensioned MPA can be mapped onto fabrication media with fewer dimensions. For example, an MPA with the shape of a four dimensional (4D) hypercube can be mapped onto a 3D stack of silicon integrated circuit (IC) chips, or onto a single 2D chip, or even a 1D line of computational units. Also low dimensional MPAs can be mapped to higher dimensional media. For example, a 1D line of computation units can be laid out in a serpentine shape onto the 2D plane of an IC chip, or coiled into a 3D stack of chips. An MPA may contain multiple types of computational units and interspersed arrangements of processors and memory. Also included in the broad sense of an MPA is a hierarchy or nested arrangement of MPAs, especially an MPA composed of interconnected IC chips where the IC chips contain one or more MPAs which may also have deeper hierarchal structure.

In general, the memory for computers and digital signal processors (DSPs) is organized in a hierarchy with fast memory at the top and slower but higher capacity memory at each step down the hierarchy. In an MPA, supporting memories at the top of the hierarchy are located nearby each PE. Each supporting memory may be specialized to hold only instructions or only data. Supporting memory for a particular PE may be private to that PE or shared with other PEs.

Further down the memory hierarchy there may be a larger shared memory typically composed of semiconductor synchronous dynamic random access memory (SDRAM) with a bit capacity many times larger than that of the supporting memory adjacent to each PE. Further down the memory hierarchy are flash memory, magnetic disks, and optical disks.

As described above, a multiprocessor array (MPA) may include an array of processing elements (PEs), supporting memories (SMs), and a primary interconnection network (PIN or simply IN) that supports high bandwidth data communication among the PEs and/or memories. Various embodiments of MPAs are illustrated in FIGS. 1 and 2, described below. Generally, a PE has registers to buffer input data and output data, an instruction processing unit (IPU), and means to perform arithmetic and logic functions on the data, plus a number of switches and ports to communicate with other parts of a system. The IPU fetches instructions from memory, decodes them, and sets appropriate control signals to move data in and out of the PE and to perform arithmetic and logic functions on the data. PEs suitable for large MPAs are generally more energy efficient than general purpose processors (GPP), simply because of the large number of PEs per IC chip that contains a large MPA.

As used herein, the term MPA covers both relatively homogeneous arrays of processors, as well as heterogeneous collections of general purpose, and specialized processors that are integrated on so-called "platform IC" chips. Platform IC chips may contain from a few to many processors, typically interconnected with shared memory and perhaps an on-chip network. There may or may not be a difference between a MPA and a "platform IC" chip. However, a "platform IC" chip may be marketed to address specific technical requirements in a specific vertical market.

An interconnection network (IN) may be either fully-connected or switched. In a fully-connected network, all input ports are hardwired to all output ports. However, the number of wires in fully-connected network increases as $N^2/2$ where N is the number of ports, and thus a fully-connected network quickly becomes impractical for even medium sized systems.

A switched network is composed of links and switching nodes. The links may comprise wiring, transmission lines, waveguides (including optical waveguides), or wireless receiver-transmitter pairs. Switching nodes may be as simple as a connection to a bus during a time window, or as complex as a crossbar with many ports and buffer queues. A single-stage network is one where all the input ports and output ports reside on one large switching node. A multi-stage network is one in which a data-move traverses a first switching node, a first link, a second switching node, and possibly more link-node pairs to get to an output port. For example, the traditional wireline telephone system is a multistage network.

Interconnection networks for parallel computers vary widely in size, bandwidth, and method of control. If the network provides a data-path or circuit from input to output and leaves it alone until requested to tear it down, then it may be said to be "circuit-switched." If the network provides a path only long enough to deliver a packet of data from input to output, then it may be said to be "packet switched." Control methods vary from completely deterministic (which may be achieved by programming every step synchronous to a master clock) to completely reactionary (which may be achieved by responding asynchronously to data-move requests at the port inputs).

For a single stage network the request/grant protocol is a common way to control the switches. A request signal is presented to an input port and compared to request signals from all other input ports in a contention detection circuit. If there is no contention the IN responds with a grant signal. The port sends an address and the IN sets switches to connect input with output. When contention is detected then an arbitration circuit (or "arbiter") will decide which one of the requesting ports gets a grant signal. Ports without a grant signal will have to wait. Ports that did not succeed in one cycle may try again in subsequent cycles. Various priority/rotation schemes are used in the arbiter to ensure that every port gets at least some service.

For a multi-stage network a particular protocol called "wormhole routing" may be used. Wormhole routing is based on the idea that a message can be formed into a series or string of words with a header for navigation, a body to carry the payload data, and a tail to close down the path. The message "worms" its way through a network as follows. Presume a network laid out as a Cartesian grid; and that a switching node and a memory is located at each junction of the grid. The header may contain a string of simple steering directions (such as go-straight-ahead, turn-left, turn-right, or connect-to-local memory), which indicate where the worm should go at each node it encounters in the network. These steering directions are so simple that a node can decode them and set switches very rapidly with little circuitry. The path, or "hole," set up by the header allows the passage of the payload data, the "body," until a codeword "tail" is encountered which causes the node to close the hole after it. Closing the path may free up links and nodes for other paths to be created by the same wormhole routing protocol.

The bandwidth of an IN may be defined as the number of successful data moves that occur per unit time, averaged over long intervals. The bandwidth of a switched IN is difficult to estimate in any analytic way because it depends on many factors in the details of the IN and in the characteristics of data-move requests put to it. When the request rate is low the chances for conflict for resources is low and almost 100% of the requests are successful. Measurements and simulations show that, as the rate of data-move requests increases, the fraction of data-moves that succeed decreases from 100%. Eventually the number of successful data-moves per second will saturate or peak and the maximum is taken as the IN's bandwidth.

An MPA may be programmed with software to perform specific functions for an application. There are two main types of software—application software, and development tools. Application software is the source text, intermediate forms, and a final binary image that is loaded into MPA memory for execution by PEs in the MPA. Development tools are software programs to design and test application software for a targeted hardware, such as language compilers, linkers, concurrent task definition aids, communication pathway layout aids, physical design automation, simulators, and debuggers. Development tool software may or may not run on (be executable by) the target hardware of the application software.

SUMMARY OF THE EMBODIMENTS

Various embodiments of a multi-processor array are disclosed. Broadly speaking, an apparatus and a method are contemplated in which a plurality of processors and configurable communication elements are coupled together in an interspersed arrangement. Each configurable communication element may include a local memory and a plurality of routing engines. The local memory may be coupled to a subset of the plurality of processors. Each routing engine may be configured to receive one or more messages from a plurality of sources, assign each received message to a given destination of a plurality of destinations dependent upon configuration information, and forward each message to assigned destination. The plurality of destinations may include the local memory, and routing engines included in a subset of the plurality of configurable communication elements.

In one embodiment, the configuration information may be included in at least one word of the one or more data words.

In a further embodiment, each routing engine may be further configured to decode the configuration information.

BRIEF DESCRIPTION OF THE DRAWINGS

FIG. 9 is a table illustrating priorities used to control a crossbar switch within a DMR.

FIG. 17 illustrates operation of one embodiment of routing logic on a header word.

Figure 1:
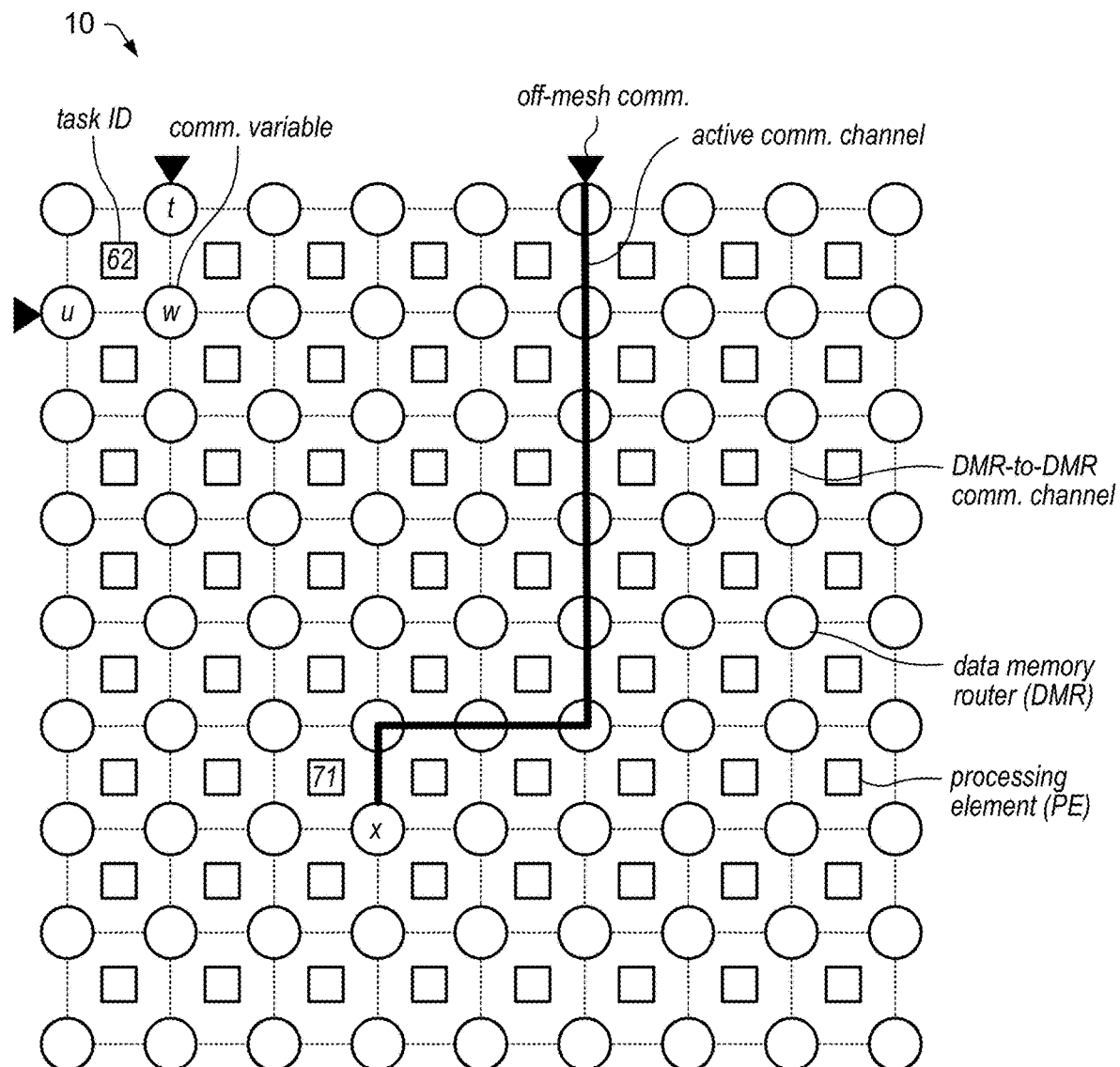
FIG. 1 is a block diagram illustrating one embodiment of a processing system, referred to herein as a multi-processor array (MPA).

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component. More generally, the recitation of any element is expressly intended not to invoke 35 U.S.C. § 112, paragraph six interpretation for that element unless the language "means for" or "step for" is specifically recited.

DETAILED DESCRIPTION OF EMBODIMENTS

Incorporation by Reference

U.S. Pat. No. 7,415,594 titled "Processing System With Interspersed Stall Propagating Processors And Communication Elements" whose inventors are Michael B. Doerr, William H. Hallidy, David A. Gibson, and Craig M. Chase is hereby incorporated by reference in its entirety as though fully and completely set forth herein.

U.S. patent application Ser. No. 13/274,138, titled "Disabling Communication in a Multiprocessor System", filed Oct. 14, 2011, whose inventors are Michael B. Doerr, Carl S. Dobbs, Michael B. Solka, Michael R Trocino, and David A. Gibson is hereby incorporated by reference in its entirety as though fully and completely set forth herein.

Terms

Hardware Configuration Program—a program consisting of source text that can be compiled into a binary image that can be used to program or configure hardware, such as an integrated circuit, for example.

Computer System—any of various types of computing or processing systems, including a personal computer system (PC), mainframe computer system, workstation, network appliance, internet appliance, personal digital assistant (PDA), grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DETAILED DESCRIPTION

Figure 2:
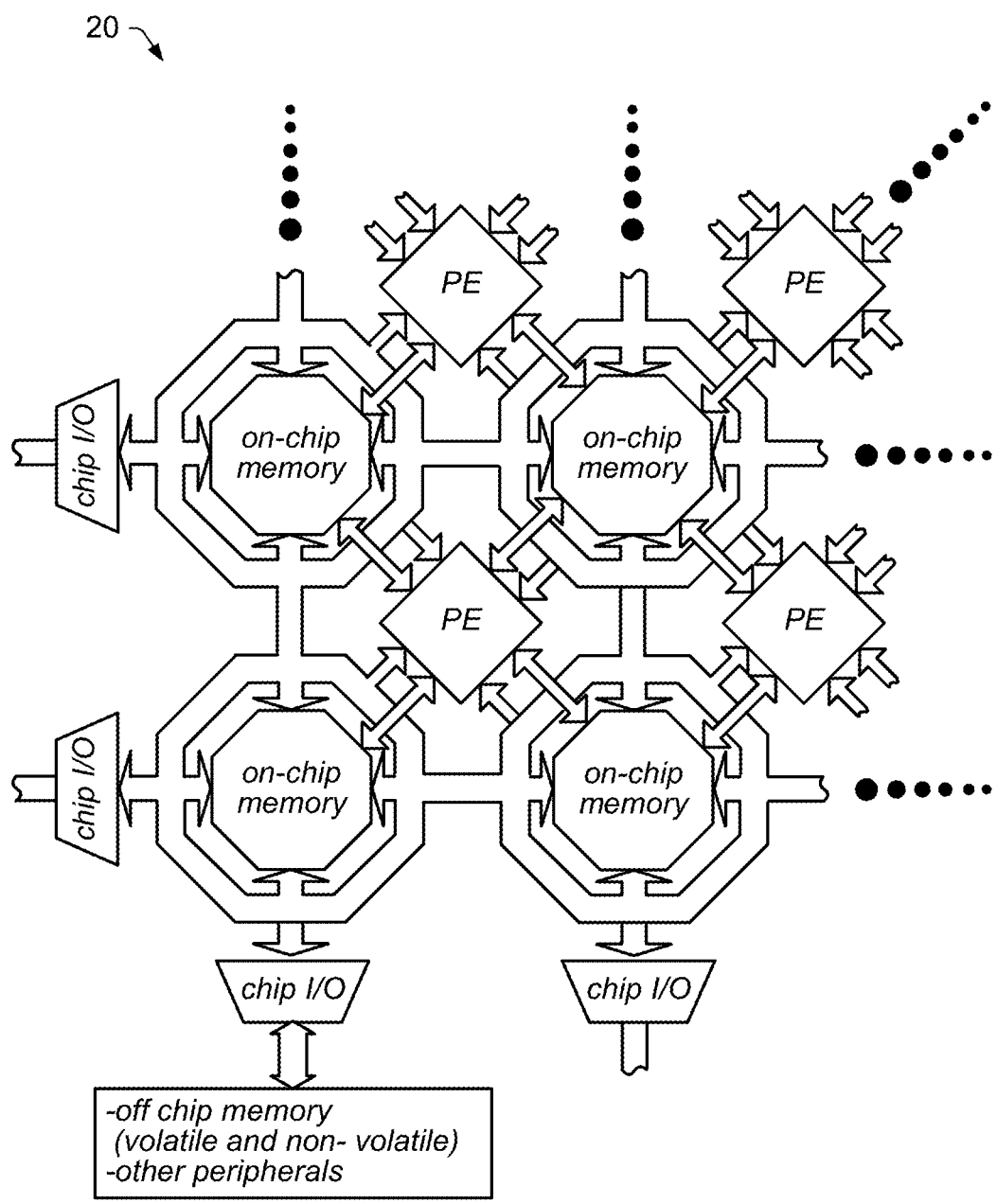
FIG. 2 is a block diagram illustrating one embodiment of a MPA connection scheme.

An example MPA architecture is shown in FIGS. 1 and 2 and it is an example of HyperX™ architecture disclosed in U.S. Pat. No. 7,415,594. In the embodiment illustrated in FIG. 1, MPA 10 includes a plurality of processing elements (PEs) and a plurality of supporting memory (SM) and an interconnection network (IN). The IN is composed of switch nodes and links. Switch nodes, also referred to as routers, may be used with the links to form communication pathways between PEs and between PEs and MPA I/O ports. However, at each PE any information communicated may be buffered in SM. In the FIG. 1, SM is combined with the communication path routers in the circular elements called data-memory routers (DMRs). As used herein, a PE may also be referred to as a PE node, and a DMR may also be referred to as a DMR node. A DMR is also referred to herein as a "configurable communication element".

The links between DMRs shown in FIGS. 1 and 2 form a rectilinear mesh; however, many other connection schemes are possible and contemplated. In the MPA connection scheme illustrated in FIG. 2, each PE is connected to four neighbor DMRs, while each DMR is connected to four neighbor PEs as well as four neighbor DMRs. Other connection schemes are also envisioned to support higher dimensionality INs, such as the use of six DMR-to-DMR links per DMR to support a three dimensional rectilinear mesh, or eight links per DMR to support the four diagonal directions in addition to the north, east, south, and west directions. Links need not be limited to physically nearest neighbors.

The combination of an MPA and application software may be called a parallel processing system (PPS), although the use of this name is not intended to limit the scope of the invention in any way. For example, an MPA may be programmed to buffer and analyze raw video data from a camera, then perform video data compression on the buffer contents for transmission of the compressed data out onto a radio link. This combination of application software and MPA may be referred to as a parallel video signal processor, for example.

MPA 20 with chip I/O cells may be used in any of various systems and applications where general purpose microprocessors, DSPs, FPGAs, or ASICs are currently used. For example, the processing systems illustrated in FIG. 1 and FIG. 2 may be used in any of various types of computer systems, digital signal processors (DSP) or other devices that require computation.

HyperX Hardware Fabric

In one embodiment of the HyperX™ architecture, a multi-processor array may be composed of a unit-cell-based hardware fabric (mesh), wherein each cell is referred to as a HyperSlice. The hardware fabric may be formed by arranging the unit-cells on a grid and interconnecting adjacent cells. Each HyperSlice may include one or more data memory and routers (DMRs) and one or more processing elements (PEs).

In U.S. Pat. No. 7,415,594, a DMR may be referred to as a dynamically configurable communication (DCC) element, and a PE may be referred to as a dynamically configurable processing (DCP) element. The DMR may provide supporting memory for its neighboring PEs, and routers and links for the interconnection network (IN). Dynamically configurable in this context means those hardware resources (PE, DMR links, and DMR memory) may be re-allocated while application software is running. This is achieved by dividing the application software into a hierarchy of smaller tasks and communication messages. These tasks and messages are assigned to resources and executed concurrently (or serially if required). As tasks and messages are completed they may be re-executed or be replaced by other tasks and messages to form a new configuration of the application software. The capability to change configuration "on the fly" supports the flexibility to make more efficient use of finite resources, and to better adapt to changing external demands, amongst others.

The HyperX hardware fabric has a primary IN (PIN) that operates independently and transparently to the processing elements, and may provide on-demand bandwidth through an ensemble of real-time programmable and adaptable communication pathways (which may be referred to as routes or paths) between HyperSlices supporting arbitrary communication network topologies. Coordinated groups of HyperSlices may be formed and reformed "on-the-fly" under software control. This ability to dynamically alter the amount of hardware used to evaluate a function allows for the optimal application of hardware resources to relieve processing bottlenecks. At the edge of the hardware fabric, links may connect to circuits specialized for types of memory that are further down the memory hierarchy, or for I/O at the edge of an integrated circuit (IC) chip.

The interconnected DMRs of the HyperX hardware fabric may provide nearest-neighbor, regional, and global communication across the chip and from chip to chip. Each of these communication modes may physically use the DMR resources to send data/messages differently depending on locality of data and software algorithm requirements. A "Quick Port" facility may be provided to support low latency transfer of one or more words of data from a processor to any network destination. For block transfers, Direct Memory Access (DMA) engines within the DMR may be available to manage the movement of data across the memory and routing fabric. For nearest-neighbor communication between PEs, the use of shared memory and registers may be the most efficient method of data movement. For regional and global data movement, using the routing fabric (the PIN) may be the most efficient method. Communication pathways (or routes) can either be dynamic or static. Dynamic routes may be set up for data transfer and torn down upon the completion of the transfer to free up PIN resources for other routes and data transfers. Static routes may remain in place throughout the program execution and are primarily used for high priority and critical communications. The physical location of communication pathways and the timing of data transfers across them may be under software program control. Multiple communication pathways may exist to support simultaneous data transfer between any senders and receivers.

Processing Elements (PE)

The architecture of the DMR may allow different interchangeable PEs to be used in a multi-processor fabric to optimize the system for specific applications. A HyperX™ multiprocessor system may comprise either a heterogeneous or homogeneous array of PEs. A PE may be a conventional processor, or alternatively a PE may not conform to the conventional definition of a processor. A PE may simply be a collection of logic gates serving as a hard-wired processor for certain logic functions where programmability is traded off for higher performance, smaller area, and/or lower power.

As illustrated in FIG. 2, PEs in an MPA, such as a HyperX™ MPA, for example, may be supplied with parallel connections to multiple memories by interspersing DMRs between the PEs. Such an arrangement may reduce the time and energy required for a given PE to access memory in a DMR relative to a segregated (i.e., non-interspersed) arrangement, and may be referred to herein as a PE and SM interspersed arrangement.

In the embodiment of FIG. 1, the ratio of PEs to DMRs is 1:1. Different ratios of PEs to DMRs may be possible in various other embodiments.

A HyperX™ processor architecture may include inherent multi-dimensionality, but may be implemented physically in a planar realization. The processor architecture may have high energy-efficient characteristics and may also be fundamentally scalable (to large arrays) and reliable—representing both low—power and dependable notions. Aspects that enable the processor architecture to achieve unprecedented performance include the streamlined processors, memory-network, and flexible IO. The processing elements (PEs) may be full-fledged DSP/GPPs and based on a memory to memory (cacheless) architecture sustained by a variable width instruction word instruction set architecture that may dynamically expand the execution pipeline to maintain throughput while simultaneously maximizing use of hardware resources.

Setup of Communication Pathways

FIG. 1 illustrates an embodiment of a HyperX™ system, including a network of processing elements (PEs) and Data Memory Routers (DMRs). The PEs are shown as rectangular blocks and the DMRs are shown as circles. The routing paths between DMRs are shown as dotted lines. Solid triangles show off-mesh communication and solid lines show active data communication between DMRs. A computational task is shown by its numerical identifier and is placed on the PE that is executing it. A data variable being used for communication is shown by its name and is placed on the DMR that contains it. In the illustrated embodiment, the top left PE has been assigned a task with task ID 62, and may communicate with other PEs or memory via the respective DMRs adjacent to the PE, designated by communication path variables t, w, and u. As also shown, in this embodiment, an active communication channel connects a PE designated 71 (e.g., another task ID) to an off-mesh communication path or port via an adjacent DMR labeled "x."

Data Memory Router

Figure 3:
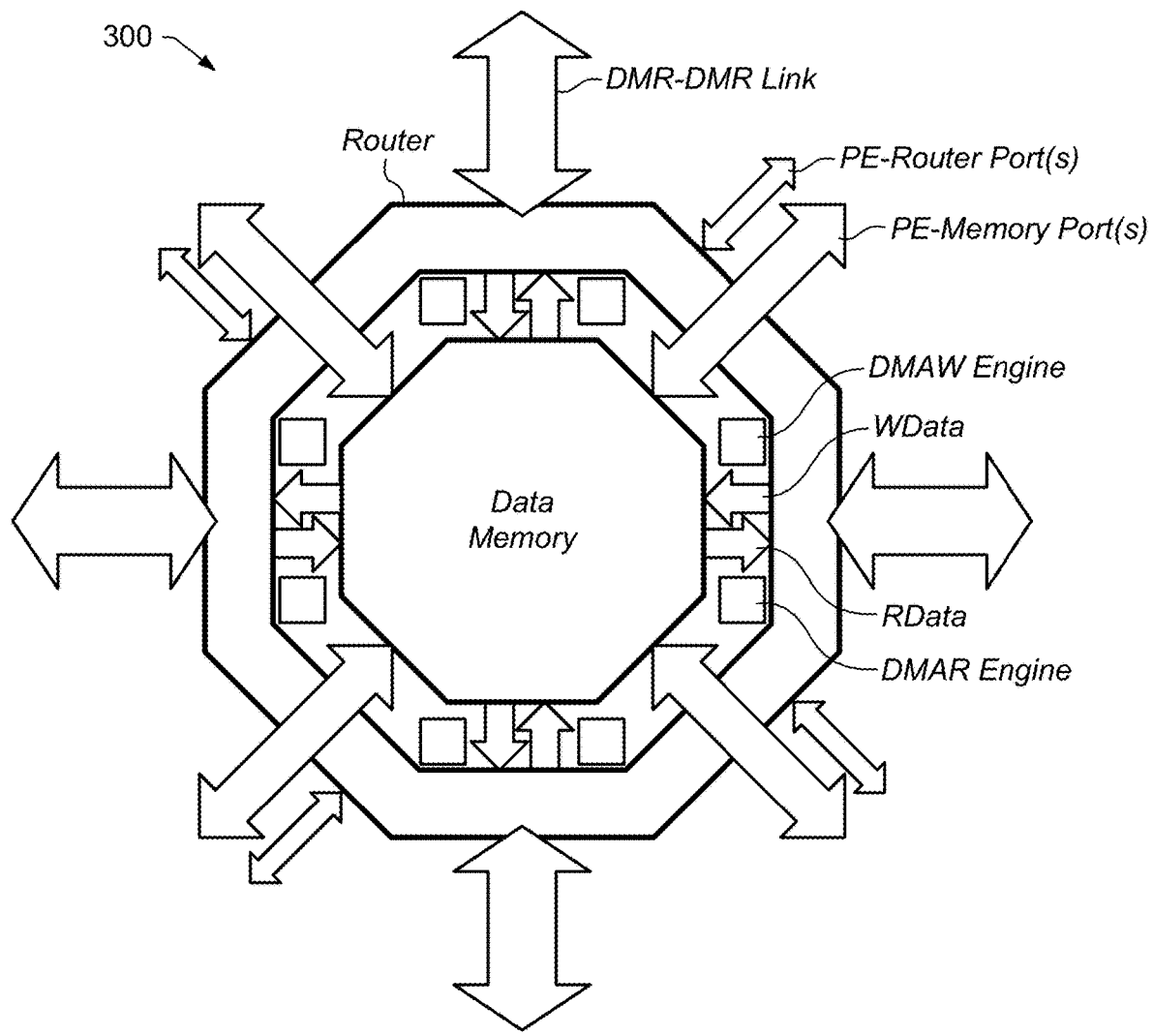
FIG. 3 is a block diagram illustrating one embodiment of a data memory router (DMR).

A block diagram of an embodiment of DMR hardware structure is illustrated in FIG. 3. In the illustrated embodiment, a central data memory (DM) is surrounded by an octagonal ring representing a router. It is noted that the octagonal shapes shown are merely symbolic, and that actual shapes may be different, e.g., may be rectangular. Surrounding the DMR are a number of bi-directional arrows representing data paths to other DMRs and PEs. These bidirectional data paths may be implemented with actual bidirectional transceivers at each end, or as a pair of unidirectional paths directed oppositely.

Unidirectional arrows between the router and the data memory in FIG. 3 represent unidirectional data paths between memory and router. A small square near theses arrows represents a DMA engine, i.e., a DMA reader (DMAR) to support readout from DM, and/or a DMA writer (DMAW) to support writing data to DM. A DMAR engine generates address signals for the memory, typically to increment across a buffer, reading data to send out a link to another DMR. Similarly, a DMAW engine generates address signals for the memory, typically to increment across a buffer, writing data that it receives from a link. Each DMA engine is much smaller than a PE and uses less power, so they are attractive to use for read and write of blocks of memory. DMA engines may be configured by PE writes to associated configuration registers in the DM memory space. Writing to a particular address triggers a DMA to start incrementing. When a DMA finishes incrementing through a block of addresses, it stops—unless configured to continue looping, either indefinitely or for a predefined number of loops.

To support high-bandwidth ports in an MPA, such as MPA 20 as illustrated in FIG. 2, the connections or links between ports (PE-to-DMR, or DMR-to-DMR) may be short (i.e., limited to neighbors) and composed of many parallel electrically-conductive traces or "wires" or "lines". In some embodiments a link may be composed of only a few parallel traces, one trace, or a waveguide.

The PE-to-DMR connections may separate traces for memory addresses from traces for data. Traces for data may be connected to transceivers to support bidirectional data transfer or separated into one set of traces to bring write data to memory and another set of traces to bring read data from memory. The DMR-to-DMR connections may not necessarily have address lines but may have lines to signify special words in the data transferred, such as control words for message header or message termination.

All DMR connections may have additional lines for flow control, For example, a line may signal upstream (from destination to source) that further progress of data words is blocked either because there is some other communication path in the way or the destination cannot accept more data. In this document this upstream line may be named "BLK", "stall", "rtr_busyout" or "rtr_busyin" to name a few. Another line may signal downstream (from source to destination) that valid data is ready. In this document this downstream line may be named "IDL", "ready", "rtr_rdy-out", or "rtr_rdyin", to name a few. Both the upstream and downstream signaling may be used to indicate the state of transmitters and receivers connected to the ends of a link between DMRs, either local (adjacent) DMRs or global (non-adjacent) DMRs. In some MPA embodiments, communication between nodes may be under programmer control.

Figure 4:
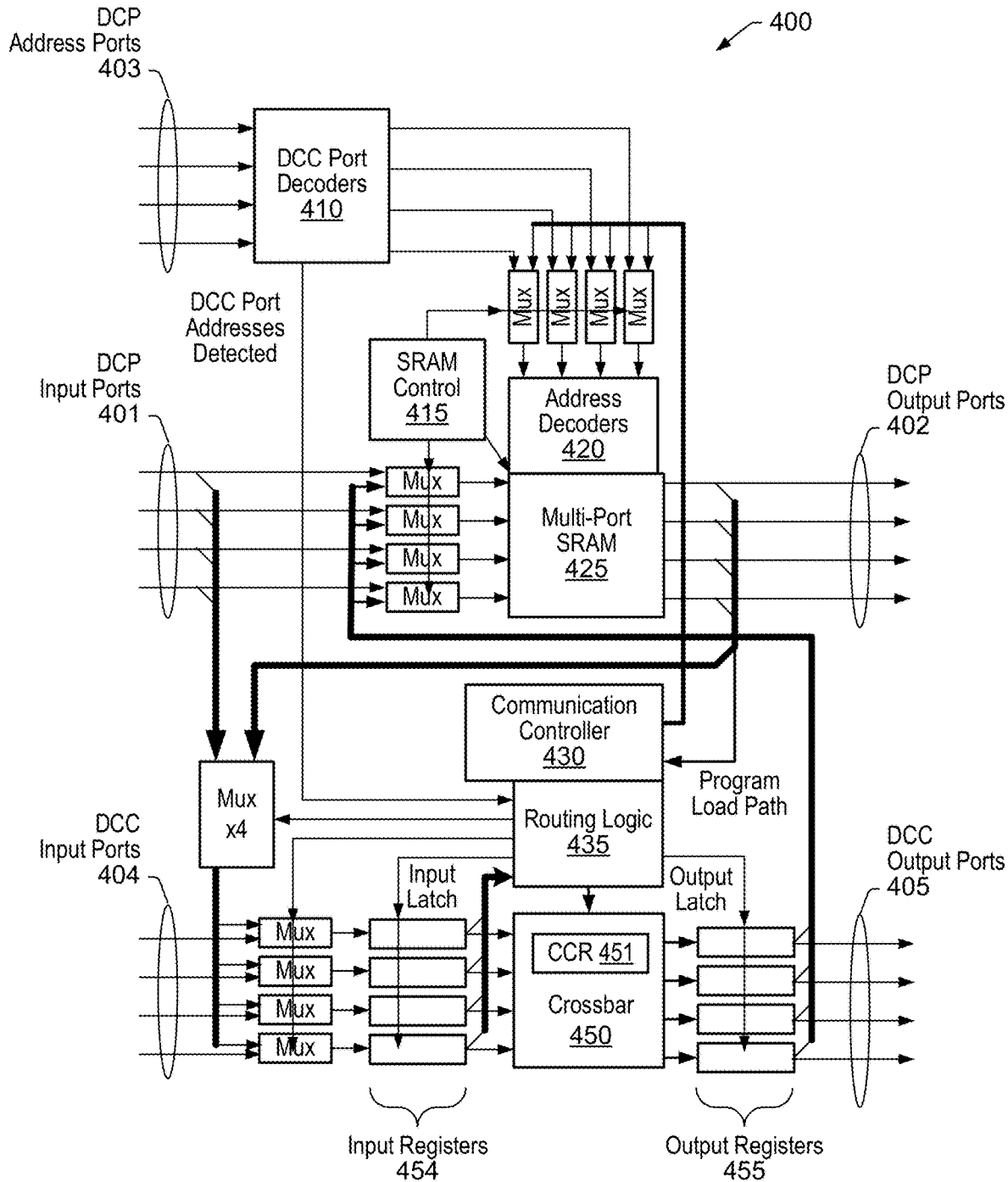
FIG. 4 is a block diagram illustrating another embodiment of a DMR.
Figure 4A:
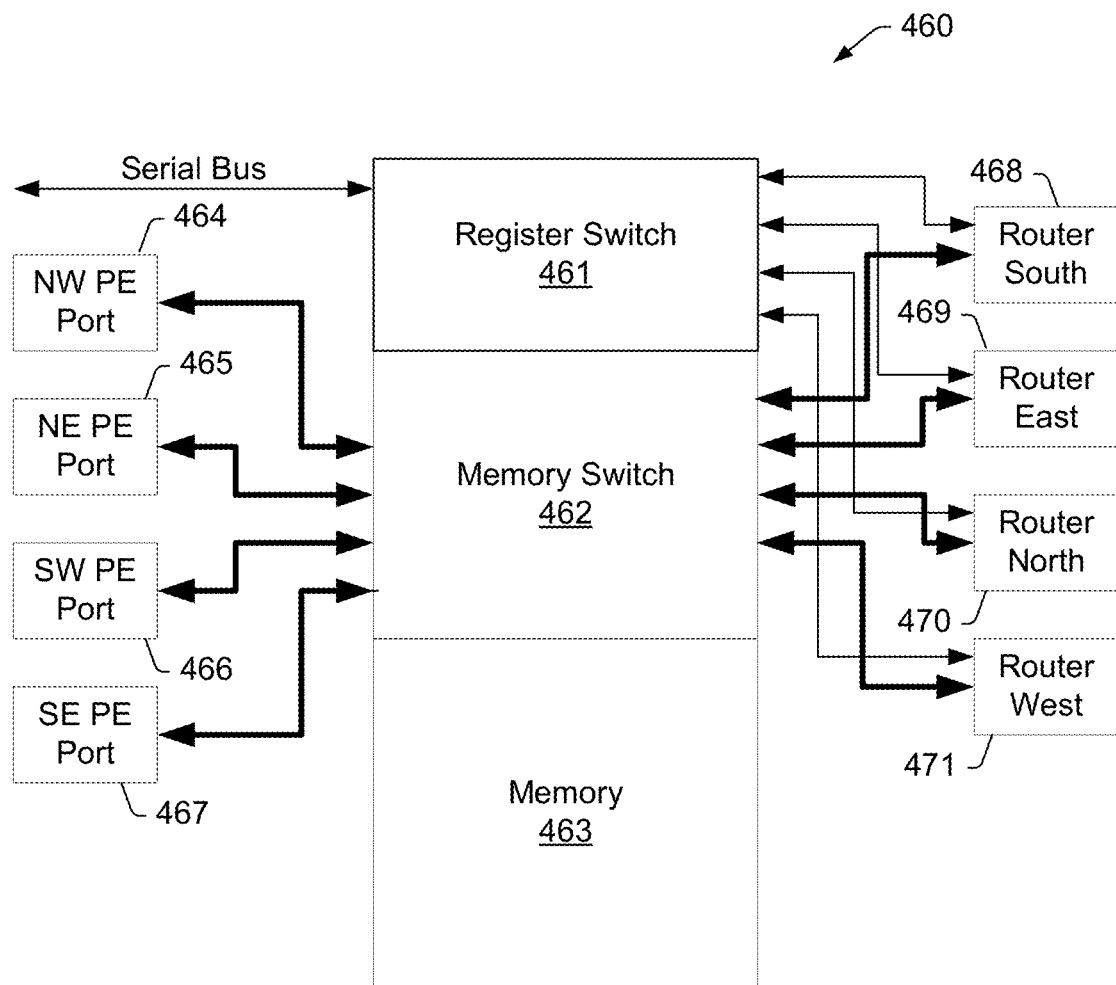
FIG. 4A is a block diagram illustrating an embodiment of a DMR.

In FIG. 4, communication controller 430 may direct crossbar 450 to route data from one or more of DMR input ports 404 to one or more of DMR output ports 405, and may thereby relay data along a path through a MPA. DMR 400 may provide additional communications paths for data. In the illustrated embodiment, multi-port SRAM 425 may receive data at its write ports from either DMR input ports 401 or output registers 455 via a plurality of muxes or multiplexers. The multiplexers may allow communication controller 430 to access multi-port SRAM 425 during times when multi-port SRAM 425 might otherwise be idle. Router controller 430 may be programmed to select data for output from Memory Switch, any of the other three DMR In-ports 404 or a Quick Port Communication Pathways in the Switched Routing Fabric In some MPA embodiments, longer distance communications (i.e., communications beyond DMRs and DMRs which are adjacent) may be supported by pathways that may be essentially logical channels. Each pathway may transport data in only one direction; if two-way communication is required, then a second pathway may be established in the opposite direction. In general, a MPA embodiment may have multiple connection links between pairs of DMRs formed by space multiplexing or time multiplexing a plurality of physical connections. Pathways may be established over such connection links. However, once a pathway is established, it may not change the connection links it uses or the DMRs to which it couples during its existence. Therefore, each pathway may be uniquely defined as an ordered sequence of DMRs and connection links, for example as a first or source DMR, a first connection link, a second DMR, a second connection link, a third DMR, a third connection link, and so forth to a last or destination DMR. In one embodiment, the set of all the pathways in a MPA may be uniquely defined by the state of all the routers.

To support the dynamic configuration of a MPA, pathways may be created quickly and destroyed quickly. In some embodiments, pathway creation and destruction may be initiated by either a given PE or a given DMR. For example, a given DMR may be configured to perform a DMA transfer to another DMR without PE intervention, and thus may be configured to create and destroy a pathway. Two methods that may accomplish dynamic pathway creation and destruction include global programming and wormhole routing. Pathway creation with global programming is described next, followed by a description of the mode and flow control features that may be common to many MPA pathways. A description of the wormhole routing method follows the mode and flow control description.

Pathway creation or setup using the global programming method may require that every pathway in the MPA be defined by software control, and may require that each such pathway be configured before the pathway is used for data transfer. This may be done either manually by a programmer or automatically, for example by a routing compiler or auxiliary software or by selecting a library function where the function code already includes pathway setup. If an ensemble of pathways is to be used simultaneously in the MPA, then it may be up to the programmer to ensure that they do not use more communication link resources than are available in the hardware. Alternatively, software tools may be used to aid the design of link resource usage.

To create a single pathway with global programming, several instructions may be loaded into the communication controllers, such as communication controller 430 of FIG. 4, within the DMRs along the pathway. The instructions may load the appropriate crossbar configuration register 451 bit-groups associated with each link in the path. In some embodiments, the instructions may do this immediately or in a sequence, while in other embodiments they may await a trigger signal of some sort. In various embodiments the hardware may or may not prevent pathways from being interrupted once established. Therefore, it may be the responsibility of the programmer or routing software to ensure only one pathway is assigned to any given link at a time. Once the Router Control state registers 451 in the DMRs all along the pathway are set, the communication pathway may be complete and ready for data. A pathway may be destroyed when it is no longer required by altering the related bit-group in the crossbar configuration registers of every DMR included in the pathway. Alternatively, an existing pathway may be left intact indefinitely, and the Router Control states along a pathway may simply be overwritten by new pathways as needed after the existing pathway is no longer required.

Wormhole Routing

To support pathway setup by wormhole routing, some MPA embodiments may provide some additional circuits. These may include, for each DMR-type port, an additional control line indicating control/data status and denoted C/D, which may be included in every connection link between DMRs and coupled to routing logic 435 in each DMR. The maximum number of wires in the connection link may nominally correspond to the sum of the number of bits per data word, plus one wire each for C/D, IDL, and BLK, the latter two for flow control, defined above. However, in some MPA embodiments these signals may be multiplexed in a number of different ways to reduce total wire count.

As data words are received at one DMR from another DMR, the C/D bit may used by the receiving DMR to distinguish header, body, and tail words of a worm. If the C/D bit is de-asserted, it may indicate that the received word is a body word. A body word may correspond to a data word plus the control bit, which may be passed along the pathway unchanged. If the C/D bit is asserted, it may indicate that the received word is a control word. A control word may allow the data portion of the word to contain a routing code for interpretation by routing logic 435.

One important feature of the routing code may be an indication of whether the control word is a header or a tail; thus, an H/T bit indicating header/tail status of a control word may be provided. In one embodiment, the H/T bit may be adjacent to the C/D bit, but in other embodiments it may be assigned to other bit positions or may be a specific multibit code. If the control word is a tail word, then it may be propagated along the pathway and may sequentially free DMR output ports for use by some other pathway.

If a control word is a header word it may be latched within input register 454 of the receiving DMR and decoded by combinatorial logic in routing logic 435. Routing logic 435 may examine the appropriate bits of the header word as well as the port from which the header came, and may issue a request of crossbar 450 for an output port as shown in Table 1. The several bits examined by routing logic 435 for the purpose of requesting an output port may be referred to as a navigation unit, or NUNIT. For a DMR embodiment that includes four DMR-type output ports per DMR, a NUNIT may use a two-bit code to specify the four direction options, as shown in Table 1. In other embodiments that include the same or different numbers of DMR-type ports, other NUNIT codes may be used. A code using two bits per NUNIT is described below. If the output port is not blocked by an already established pathway then routing logic 435 may evaluate the NUNIT and allow the worm to proceed. For example, if a header word arrived from SRAM (a type of DM) with a NUNIT code of 10, routing logic 435 may request the East output port from crossbar 450 for the header word and subsequent words of this worm.

TABLE 1

Output port as a function of direction code and input port.

| Direction (code) | Input ports | | | | |
| --- | --- | --- | --- | --- | --- |
| | North | East | South | West | SRAM |
| Straight through (11) | S | W | N | E | N |
| Left turn (10) | E | S | W | N | E |
| Right turn (01) | W | N | E | S | S |
| Null (00) | SRAM | SRAM | SRAM | SRAM | W |

FIG. 17 illustrates operation of one embodiment of routing logic on a header word. FIG. 17 depicts a header word as it progresses through multiple DMR nodes on a pathway from a source node to a destination node. Case (a) may illustrate a header word in its initial state originating in a source DMR. In this state, the header word includes a C/D bit, an H/T bit, and a plurality of header NUNIT fields numbered HN0 through HN4, with HN0 occupying the least significant bits of the header word.

At each DMR including the source and destination DMRs, the header word may be passed on to the output of the crossbar with modification as follows. The header word may be right shifted by one NUNIT and filled with zeroes from the left. The C/D and H/T bits may then be restored to their original positions. Cases (b) through (e) of FIG. 10 may illustrate the header modification that occurs after the header has been processed by one through four DMRs, respectively. As it passes through each DMR the lead header word may fill with more zeroes until the null code is in the rightmost NUNIT, as shown in case (e). If the null code is the rightmost NUNIT when the header word is not from the same DMR (controller or neighbor DMR), and the next worm word is not a control word, then the header word may be at the destination DMR for that worm.

The check for arrival at the destination DMR may require multiple clocks. First the lead header word may be moved into one of input registers 454 and tested by the Router Control logic 435 for the null code in the rightmost NUNIT. If the null code is found, then in the next clock cycle the next word of the worm may overwrite the lead header word and its C/D and H/T bits may be tested. If the next word is another header word then it may become the new lead header word, and its rightmost NUNIT may be used to select the output port for the next DMR. There may be many header words per worm in order to route across large arrays. If the next word is a body word rather than a header word, the worm may be at its destination DMR. In this case the body word may be written to a preset SRAM location in the DMR. The arrival of a body word at a location may be detected by the DMA logic of communication controller 430, or by a DMR, either of which may service the arrival of subsequent body words. Information regarding how to service the worm may either be preloaded at the destination node or included in the worm right after the header.

Figure 18:
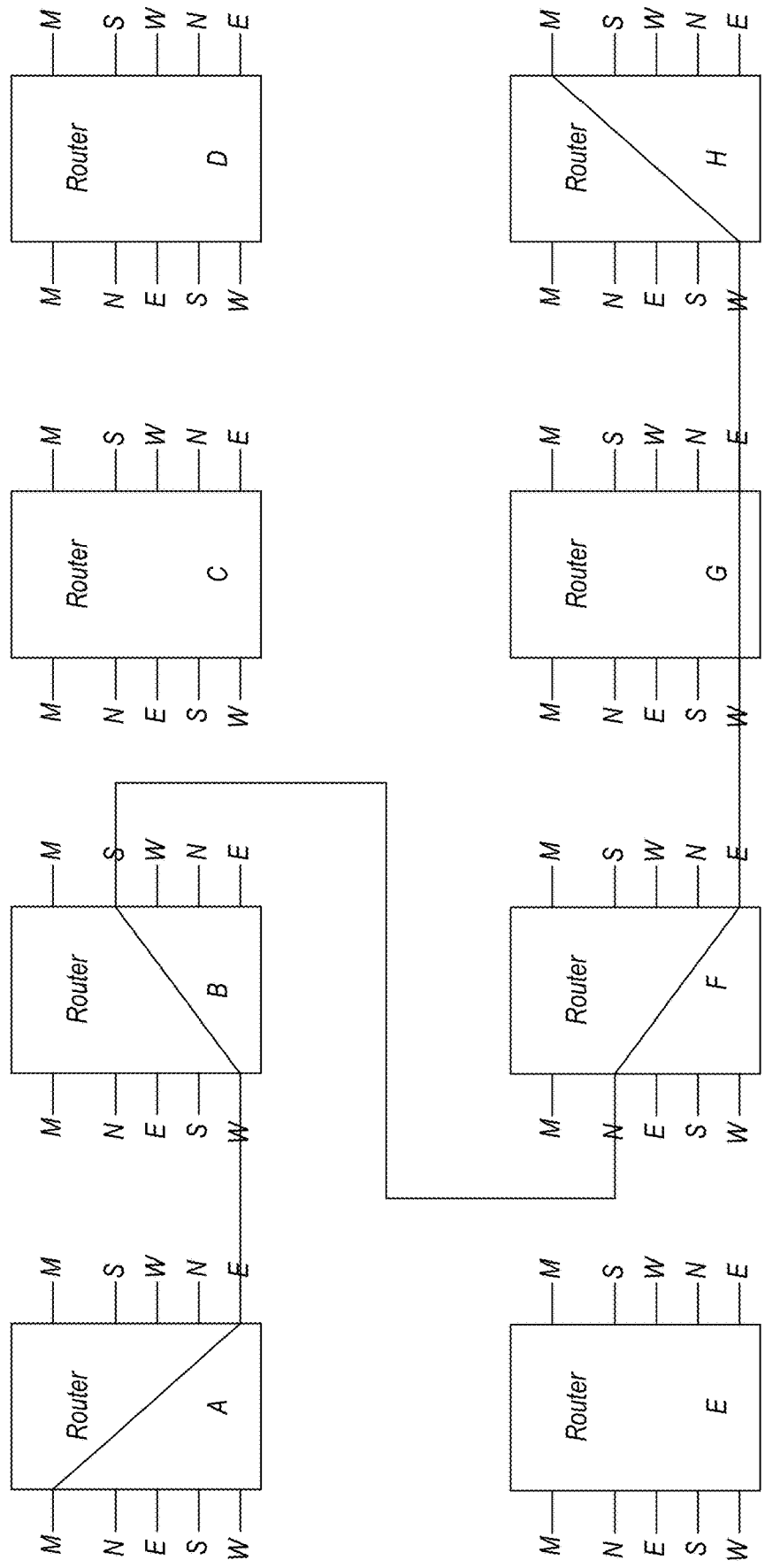
FIG. 18 depicts a block diagram illustrating an example pathway through a portion of a MPA.

FIG. 18 is a block diagram illustrating an example pathway through a portion of a MPA. FIG. 18 depicts eight routers denoted "Router A" through "Router H." Each depicted router may be exemplary of router of FIG. 4B. Although the additional logic is not shown for simplicity, each depicted crossbar may be included in a respective DMR such as, e.g., DMR 400 as illustrated in FIG. 4, and each such DMR may be coupled to other DMRs within a MPA, such as MPA 20 as illustrated in FIG. 2, for example.

In the illustrated embodiment of FIG. 18, each of routers A-H includes four input ports denoted N, S, E, and W on the left edge of the router as well as four output ports denoted N, S, E, and W on the right edge of the router. Each route's input ports may be coupled to DMR input ports 404 of the respective DMR, and each router's output ports may be coupled to DMR output ports 405 of the respective DMR. Additionally, each of routers A-H includes an input connection and an output connection to a memory, such as multiport SRAM 425 of FIG. 4, which connection is denoted M on the left and right edges of the router, respectively.

In the illustrated embodiment, each router A-H is coupled to a plurality of neighboring routers via each respective DMR such that each output port N, S, E, W of each router is coupled to a respective input port S, N, W, E of each of the plurality of neighboring routers. Thus, in the illustrated embodiment, each router may be coupled to receive inputs from and send outputs to four neighboring routers. It is noted that in alternative embodiments, different number of routers, each including a different number of input ports, output ports, and memory connections, may be employed.

FIG. 18 illustrates a pathway from a source DMR including router A to a destination DMR including router H, which pathway traverses DMRs including routers B, F, and G. Referring collectively to FIG. 17 and FIG. 18, a 2-bit NUNIT code defined according to Table 1 may be used to implement the illustrated pathway as follows. The pathway originates in the SRAM coupled to router A via input memory connection M and exits router A via output port E. According to Table 1, the NUNIT for router A should be 10. Output E of router A is coupled to input W of router B, and the illustrated pathway exits router B via output port S. According to Table 1, the NUNIT for router B should be 01. Output S of router B is coupled to input N of router F, and the illustrated pathway exits router F via output port E. According to Table 1, the NUNIT for router F should be 10. Output E of router F is coupled to input W of router G, and the illustrated pathway exits router G via output port E. According to Table 1, the NUNIT for router G should be 11. Finally, output E of router G is coupled to input W of router H, and the illustrated pathway ends in the SRAM coupled to router H via output memory connection M. According to Table 1, the NUNIT for crossbar H should be 00.

Thus, a header control-word implementing a wormhole routing in the format of FIG. 17 for the path illustrated in FIG. 18 may include an asserted C/D bit indicating a control word, an asserted H/T bit indicating a header word, and the values 00, 11, 10, 01, and 10 corresponding to fields HN4 through HN0, respectively. It is noted that the illustrated pathway is merely one of many possible pathways through one MPA embodiment. In other embodiments, different numbers of routers and ports may be employed, and different pathways and routing methods are possible and contemplated.

Since each NUNIT may be consumed by a specific DMR along a pathway, one or more bits may be added to each NUNIT to request specific behavior at individual DMRs. For example, in one embodiment, one added bit per NUNIT may be used to specify that a given DMR shall operate in a multi-layer mode or not. In such an embodiment, a wormhole-routed path may use different modes at different DMRs along the way depending on the programming of the header.

In another embodiment, a PE may send a header word directly to the crossbar inputs of a neighboring DMR, such as DMR 400 as illustrated in FIG. 4, for example. A PE may do so by specifying a particular Register address to a neighboring DMR via DMR address ports, and sending the header word(s) to the output Router of that DMR via same Register address. Routing Control logic, such as, e.g., routing control logic 435 as depicted in FIG. 4, may be configured to then send the worm on its way to its destination without using the Memory Switch or Memory. This technique may provide a more efficient short message passing capability between PEs.

Collision Handling

A pathway being set up by wormhole routing may come upon a DMR with one or more other pathways either already routed or in the process of being routed through a given DMR. A resource conflict may occur when one or more inbound header words requests the same crossbar output port at the same time (a collision) or when the output port is already occupied by a pathway (a blockage). Routing Control logic may include logic configured to arbitrate which pathway receives access to the contested output port in case of a collision. Routing Control logic may detect the collision and grant only one worm access to the contested output port. Various priority/rotation schemes (e.g., a round-robin scheme) may be used to shape the traffic distribution and ensure that no particular input port is always refused access to a requested output port.

When a pathway being initially set up by wormhole routing is blocked, it may be advantageous to stop the forward progress of the blocked worm without destroying it. In this case, the flow control mechanism described above may be employed. The word "worm" is used here to represent an ordered sequence, or string, of flow units (referred to as "flits" in the literature) that may be words, bytes, or other bit groups. In some embodiments the DMR flow control protocol may operate as follows. When a worm encounters a blockage, the lead flit of the worm may be latched in an input register of the blocking DMR, and the BLK signal may be driven backward to the next upstream DMR in the pathway to latch another flit of the worm in input registers of the next upstream DMR. This process may be repeated back to the DMR containing the tail word of the worm, or to the source DMR if the tail word has not yet been sent by the source. The data in the worm may be captured in the input registers and output registers of DMRs in the pathway that are configured to operate in a synchronous data transfer mode. As described above, two words may be stored per DMR, resulting in a "scrunched" or "telescoped" condition of the stalled worm. The worm may stay frozen indefinitely until the blocking conditions go away, following which, its forward motion may be automatically restarted by the propagation of the de-assertion of the BLK signal. The above description of DMR flow control protocols assumes one flit to be stored in a link input port register and one flit to be stored in a link output port register; however, additional registers may be added to store additional flits per port under blockage conditions, and this may provide additional elasticity to the length of the worm. In some embodiments the source end of a particular pathway may stop sending flits temporarily and de-assert the "ready" signal, and the flow control signaling may progressively stop the forward motion of flits until the destination end receives the de-assertion of the "ready" signal, whereupon the worm will be frozen in place until the source starts sending again. In an alternative protocol embodiment the temporary stop of source data sending and de-assertion of the "ready" signal may create a bubble in the pathway composed of flits with a de-asserted "ready" bit. The bubble may progressively grow until either the source resumes sending data or the bubble reaches the destination, whereupon the destination receiver continues to read flits but discards all flits which contain de-asserted ready bit. When the source resumes sending data the bubble collapses against the destination receiver; and the destination receiver may resume receiving data upon the appearance of an asserted "ready" bit. In some embodiments multiple protocols may be supported by hardware and selected by software.

Several example applications illustrating MPA functionality are discussed below. It should be noted that such examples are not intended to limit the structure, function, or scope of a MPA or its components, but are intended only to facilitate understanding of the foregoing description. It is contemplated that numerous variations of these examples may be employed, and that there may be numerous alternative applications to the ones discussed below.

Multi-Layer Interconnect

Multi-processor systems such as those described above, may require hardware (e.g., DMRs and PEs) and software to work in a cooperative manner in order to accomplish a particular computing task. To realize the cooperation between various processors of the system, a network may be used to transmit data and instructions between individual processors. In some embodiments, multiple networks may be employed for communication between processors.

A network within a multi-processor system that has high data throughput capacity may be designated as a primary interconnect network (PIN), which may be composed of links (i.e., one or more wires that run between nodes) and nodes. Nodes may have ports that may be employed to connect to local processing engines, local memory units, or to I/O ports at the boundary of the multi-processor array. Other networks, which may be constructed in a similar fashion, with lower data throughput capacity, may be designated as secondary interconnection networks (SINs), such as, e.g., the serial network described in U.S. patent application Ser. No. 13/274,138. Such secondary networks may be used for control, testing, debug, security, and any other suitable application.

Nodes may include a switch, which may be capable of making independent connections between one link or port and another link or port, and may correspond to a DMR. In some embodiments, nodes located near the edge of an integrated circuit, may have specialized ports for off-chip communication with other IC chips of the same or different types, such as, random access memories (RAMs) or general purpose processors (GPPs), for example.

In some embodiments, a PIN topology may include a 2-dimensional mesh consisting of a 2-dimensional array of nodes. Each node may have a north, south, east, and west link to another node. A 3-dimensional mesh may be achieved with the addition of adding "up" and "down" links to each node of a 2-dimensional mesh allowing the connection of one or more 2-dimensional meshes. 3-dimensional meshes may be connected in a similar fashion to form what is commonly known as a "hypercube mesh." Although 2-dimensional and 3-dimensional meshes have been described, in other embodiments, any suitable number of dimensions may be employed to form a multi-dimensional mesh. A dimension need not be infinite in potential extent; instead it may loop back on itself, forming a mesh cylinder or a mesh torus. And in some embodiments a group of PE may be interconnected with a PIN which is randomly formed and then mapped so as to give addresses to destinations Wiring technology may influence the relative density of links in each dimension. In some embodiments, such as circuit boards or VLSI ICs, available wiring density is high in the circuit plane, but limited in the third dimension. A 3-dimensional mesh may be accommodated by using less links in the third dimension, or by projecting all of the links into the circuit plane. Nodes and link routing may then be adjusted to create an area-efficient layout.

Such a layered approach to forming networks may allow for high dimension networks without the need for exotic fabrication technology. Higher dimension interconnection networks may provide more communication pathways between computation resources, i.e., processing engines and memory units. In some embodiments, links may be routed across memory units, allowing additional PIN resources with minimal increase to silicon area of a multi-processor system. Higher dimension networks may also be implemented using advanced packaging techniques including through-silicon vias (TSV) and various types of silicon interposer technologies.

To realize the layered networking approach, a node may include a data-path switch, flow-control signaling, and a router control mechanism (RCM). The data-path switch may be configured to establish connections, each connection enabling a data path between an allowed subset of links and ports. For example, a connection may be established between a link and a different link, between a link and a port, or between a port and a different port. In some embodiments, the data-path switch may include word-wide bit-parallel multiplexer whose outputs may be coupled to the outgoing portion of a link or port, and their inputs may be coupled to the incoming portion of a link or port. In some embodiments, synchronously clocked registers may be used at a link or port interface to buffer incoming or outgoing data and adjust its timing. In various embodiments, the data path switch may be implemented with a single stage of multiplexing, while in other embodiments, the data path switch may be implemented with multiple stages of multiplexing.

The multi-layer IN switching node of one embodiment of the invention, in its most general form, includes layer switching and directional switching for multiple communication pathways that may be sourced at the node, traversing the node, or terminating at the node. The node interprets the inbound data arriving at its ports according to a configurable protocol to determine what to do with it. The smallest unit of data that can be accepted by the ports that are linked to other nodes in the IN is also the smallest unit subject to data flow control on the links, and in the literature it is referred to as a flow unit or "flit."

The flow control signaling may regulate the flow of data across each connection so that data is not lost by a sending more data than a receiver can absorb, or by a receiver duplicating data that a sender could not send fast enough. Data sent into a channel at a source port may appear at its destination port after some period of latency. In some cases, the latency period may correspond to one clock period per link traversed. To prevent data loss, the rate of data flow in the channel may be controlled by hardware, software, or a combination thereof. In some embodiments, hardware flow control signaling may use a binary electrical signal from sender to receiver indicating that data is ready, and another binary electrical signal from receiver to sender requesting that the sender should wait (stall) before sending more data. These flow control signals may follow a data path in parallel, including transit through data multiplexers.

The route control mechanism may be configured to process connection requests for resources (links or ports). In some embodiments, an RCM may search across multiple inputs (generally from different directions) for an incoming signal. If the signal contains a code requesting a particular resource, the RCM may check that the requested resources are available, i.e., the resources are not reserved by a pre-existing connection. If requested resources are available, an RCM may grant the request, send a signal to data path multiplexers to make the connection, and establish flow control signaling across the connection. Conversely, if requested resources are not available, the RCM may not grant the request and may signal the requesting input to stall the sender until the incompatible pre-existing conditions are removed. Alternatively, the RCM may time-share the blocking connection and allow the requested connection on a part-time basis (commonly referred to as "cut-through"). While stalling or time-sharing any particular subset of the inputs, the RCM may search the remaining set of inputs for an incoming signal.

An RCM may include an arbitration mechanism to deal with simultaneous requests for available resources. If two or more connection requests for the same resource (link or port) arrive at the same time, an RCM may arbitrate them and select a winner. In some embodiments, the arbitration scheme may be a priority scheme, a round-robin scheme, or any other suitable arbitration method. In other embodiments, the arbitration scheme may be configurable to be a priority scheme, round-robin, or any other suitable arbitration method.

When a termination command for a particular connection is received, an RCM may relay the termination command to any output link, and release the resources associated with the connection. Released resources may be immediately available for making other connections. In cases where a cut-through had been established, the RCM may restore the resources to the pre-existing connection that was cut. It is noted that in various embodiments, an RCM may perform other functions or duties.

Routing through a PIN may be performed in a hierarchical fashion, with different techniques employed at different levels of the hierarchy. The RCM within a node is the lowest level, the setup and tear down of communication pathways (channels) is the intermediate level, and the group selection of pathways to minimize mutual interference is the top level. At the node level, routing is basic and fast, and typically is implemented in hardware. At higher levels of the routing hierarchy, the routing is more complicated and may be accomplished in software.

At the node level, routing is accomplished with the routing control mechanism as described in more detail above. In some embodiments, the RCM may be implemented as a state machine. Routing request may arrive from a local PE via a port into the node. Routing requests may also arrive from a link, encoded in a header of a message. As described above in more detail, routing requests encoded in a message form the basis of a channel configuration method commonly referred to as "wormhole routing." In such a routing method, a message is composed at a source node and pre-fixed with a header that describes where a channel is to go. In various embodiments, different header styles may be employed.

An RCM may also monitor the traffic in connected channels and use this information to locally adjust connections into more optimal arrangements. For example, if two paths are time shared on a link and one of the paths is relatively busy compared to the other connection, the RCM may be permitted to allocate a larger fraction of time to the path with higher traffic load. In another example, if a switch node has additional links to bypass local traffic, then through traffic may be shifted to these links, freeing up local resources for sourcing or terminating a path.

When a path is no longer needed, a "tail" code may be sent into the source port of the path. In some embodiments, the tail code may sent automatically by the hardware of the system. Software may control the sending of the tail code in other embodiments. As the tail code propagates along the established path, individual RCMs clear the connections and release its respective routing resources. The tail code insertion can be automatic via hardware or sent under software control. In some embodiments, extra data bits may be included in the links to distinguish header and tail words from the message body. A word parity bit may also be carried in any link to assist in data integrity.

Pathways (also referred to as channels) may be static or dynamic. A static path may be set up and used for the duration of a given application, while a dynamic path may be created for message transfer and then torn down, freeing links and nodes for other pathways to be formed. In some embodiments, a dynamic path may be torn down and replaced at a later time by another instance of itself.

As described above, a worm header may contain routing information such as source address, intermediate addresses, destination address, and mode requests. Of this information, the destination address is usually required and it may be coded in many different ways. In one embodiment, an address may be encoded as a sequence of turns while, in other embodiments, an address may be encoded as Cartersian X-Y pairs, or any other suitable encoding method. In some embodiments, the routing information may take the form of a sequence of navigation units (commonly referred to as "nunits"). The nunits may be encoded to request connection resources (links or ports) and modes of each node and RCM that is encountered while setting up a communication pathway.

Minimal (2-bit) nunit codes may request to connect "straight-ahead," "turn left," "turn right," or "stop." As a header message passes through a node, the sequence of nunits may be shortened from the front as the connection instructions are executed. When a "stop" instruction is encountered, the RCM may direct the data path multiplexers to present the remainder of the worm message to a register for access by a PE or DMA. Multiple such registers may be supported in a DMR so as to support multiple channels simultaneously. The address of such a register may map to the corresponding arrival direction at the destination node, enabling a particular PE to wait for the arrival of a message from a particular direction.

Although 2-bit navigation units are described above, in other embodiments, any suitable number of bits may be used in navigation to allow for INs with higher dimension mesh connections and also for additional router modes. For example, an additional bit may be encoded in each nunit. An additional nunit bit may allow for connection instructions to switch layers, "go up," or "go down," and may be compatible with a two or more layer PIN. An additional nunit bit might be used to modify router modes, such as fixed or optimizing, where optimizing might apply to time-share ration, express routing using non-nearest neighbor links, or other optimizations.

Application software on a multi-processor array (MPA), may require an ensemble of many communication pathways between and among PE and chip I/O interfaces. Since two or more pathways may block each other, and the probability of blocking becomes a certainty when too many paths are crowded onto finite resources, the routing of an ensemble of pathways reduces to finding at least one feasible (non-interfering) ensemble of routes. As the density of paths increases, a feasible ensemble may become more difficult to find. A measure of path density is the path-to-link fill ratio (i.e., the total length of paths divided by the total length of links). As the fill ratio approaches 100% it may become impossible to complete all of the path routes.

Routing of an ensemble of communication pathways (paths) may be accomplished with a software tool referred to as a "router" which may be included as part of the development suite of software. A programmer (perhaps employing a task placement tool) may provide the router tool with a list of paths that need to be routed, also referred to as a netlist. Initially, a path may only be specified by the location of its source and destination nodes. For each path to be routed, the router may select a minimum-distance sequence of links from the source to the destination. When after the first pass, there are paths blocking other paths, the ensemble may be re-routed using blockage reduction techniques. The re-routing with blockage reduction may be repeated until no blockages are detected.

A method to make the routing process easier may involve restructuring the application software algorithm to reduce the number of paths required. In some cases, path density is high when multiple paths are seeking the same node or attempting to exit from a node. To reduce crowding in such cases, an algorithm may be distributed across multiple nodes, effectively distributing message traffic across more links. In hardware re-design, the DMR link capacity may be increased to allow more connections per node. Another method to make the routing process easier may involve increasing the number of available connection resources (links and switches) per DMR.

With the objective of adding connection resources to a DMR, the additional resources may be organized in layers added to the IN. Each added layer may contain a set of node to node connections, and each router may include a set of data path multiplexers, flow control signaling, and a router control mechanism. To permit any communication pathway to cross from one layer to another, additional data path switches and their control may be needed.

Figure 4B:
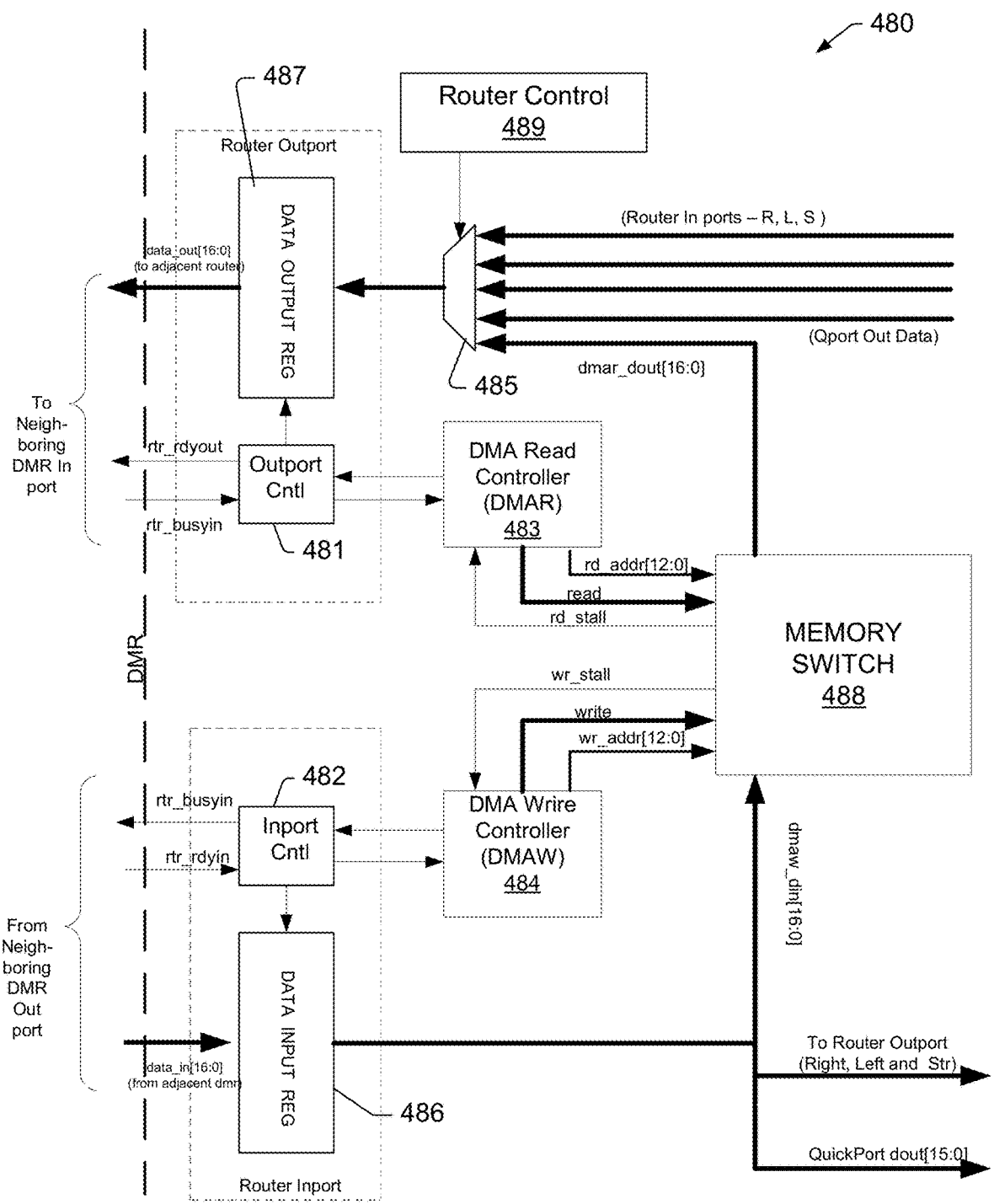
FIG. 4B is a block diagram illustrating an embodiment of a portion of a DMR.
Figure 5A:
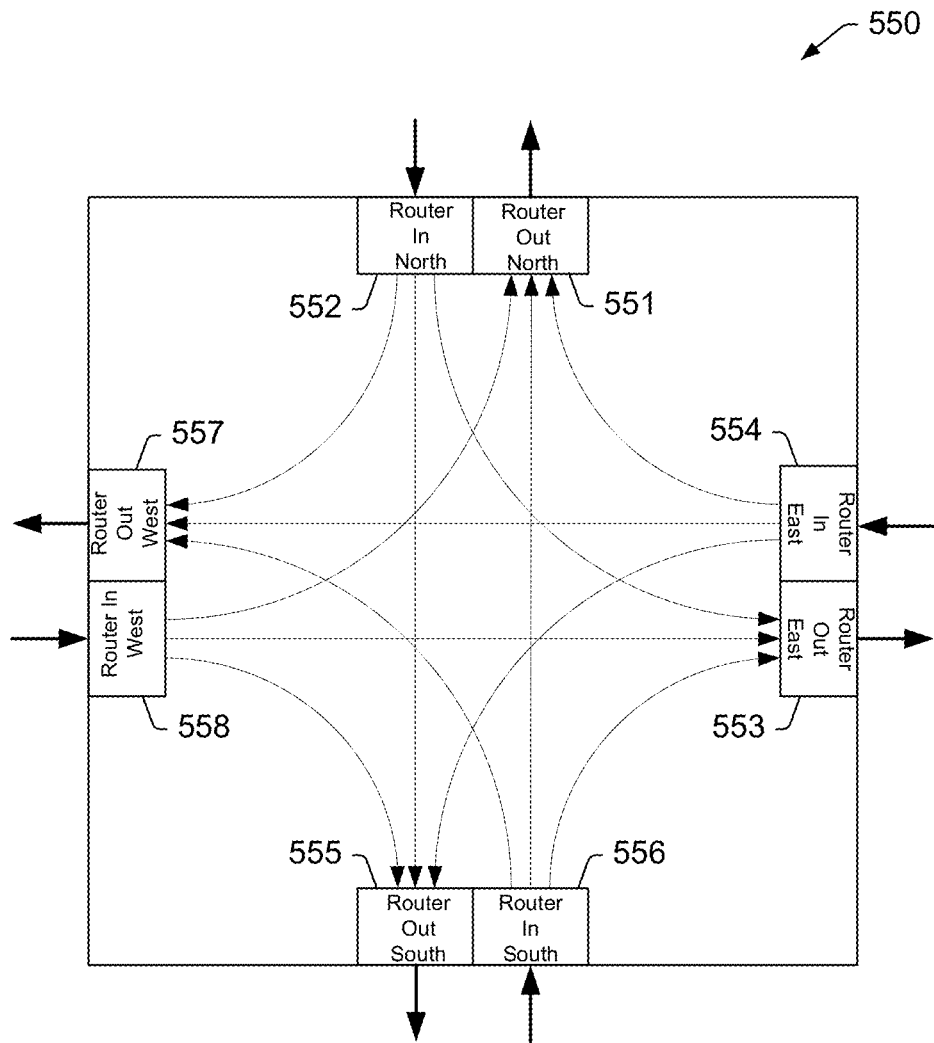
FIG. 5A is a block diagram illustrating an example of port arrangement of a DMR.

FIG. 5A shows an example embodiment of a single layer directional switch for a DMR node 550 in a single layer IN. Links between DMR nodes connect to input and output ports on each DMR. These ports in turn connect to a directional switch (router) in the DMR. The Router input components 552, 554, 556, and 558 are further detailed in the lower half of FIG. 4B—items 482, and 486. The Router output components 551, 553, 555, and 557 are further detailed in the upper half of FIG. 4B—items 481, 485, 487, and Router Control Logic 489. Note in FIG. 4B that the Input port data register 486 buffers input flits and connects to three Router output components (for turn left, go straight, or turn right) and (for terminating pathways) to the Memory Switch 488, and the Quick Ports (not shown) to be available directly to be connected PEs. In FIG. 5A, the lines drawn between Router input components and Router output components represent multi-bit busses that may be selected by Router Control Logic 489 and data-path multiplexers 485 in the output components.

Figure 5B:
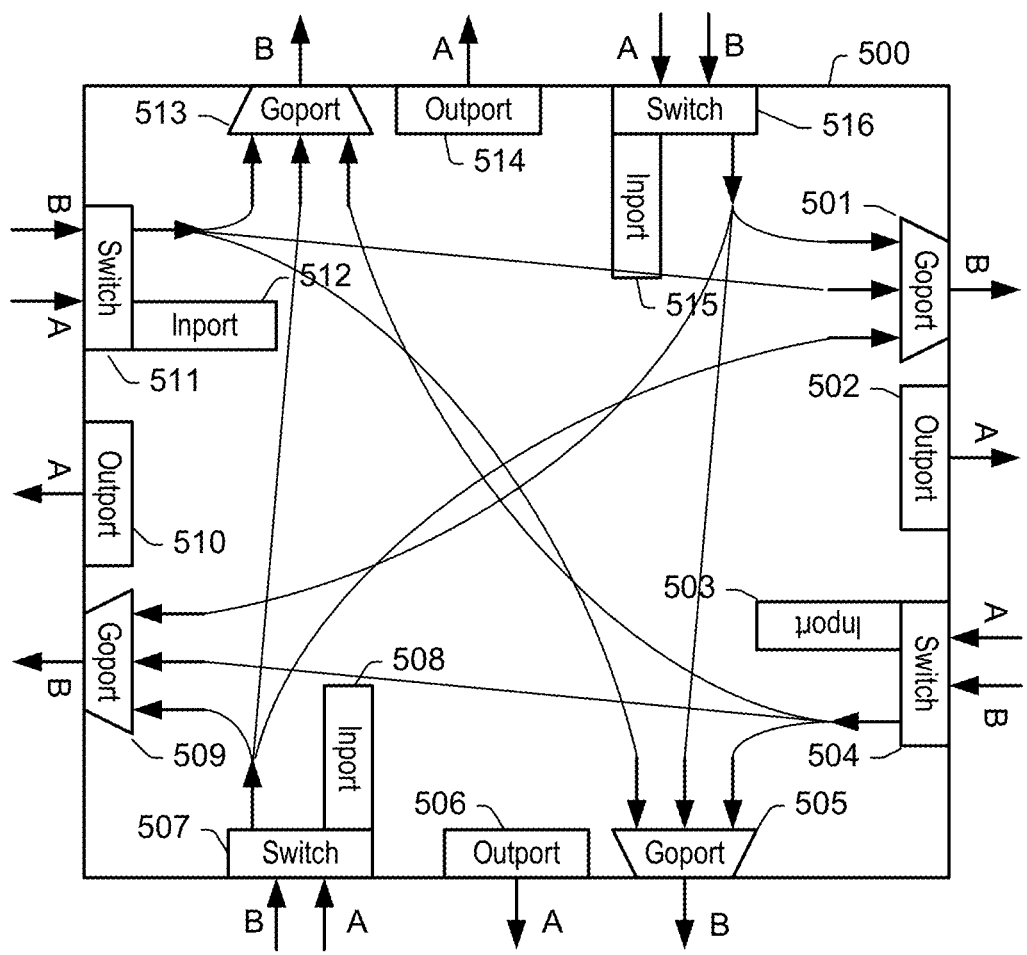
FIG. 5B is a block diagram illustrating another example port arrangement of a DMR.

FIG. 5B, illustrates an embodiment of a two-layer directional switch for a DMR node 500 in a two-layer IN. In the illustrated embodiment, node 500 includes an added global (layer B) composed of output ports 501, 505, 509, and 513, and the B side of the input switches. In FIG. 5B the lines drawn between B-side of input switches and Goports represent connections of multi-bit busses that may be selected by data-path multiplexers at the Goports.

In the embodiment illustrated in FIG. 5B the pre-existing local (layer A) directional switch may be the same as shown in FIGS. 4B and 5A; but to keep FIG. 5B uncluttered, only the output ports 502, 506, 510, and 514, and inputs ports 503, 508, 512, and 515 of Layer A are shown.

As depicted in FIG. 5B, Node 500 further includes input switches 504, 507, 511, and 516 that are coupled to the local (layer A) inputs ports 503, 508, 512, and 515, respectively. The purpose of the input switches is to allow an inbound communication pathway to switch from the local (layer A) to the global (layer B) or from the global (layer B) to the local (layer A). In some embodiments, crossbar switches 504, 507, 511, and 516 may be composed of 2 input and 2 output (2×2) crossbar switches capable of only two states, one being straight-through connections and the other being crossed connections.

In the embodiment illustrated in FIG. 5B, the input switch control logic (not shown) may be separated from the router control logic 489. Taken together the input switch control logic and the router control logic may be considered the router control mechanism.

Each crossbar switch receives data from an A port and a B port and selectively passes data either through on the same layers or crossed from layer to layer. Local (A layer) output ports 502, 506, 510, and 514 may accept data from DMA or PE and transmit data to their respective A links. In some embodiments, the local (A layer) output ports may also connect with input ports 503, 508, 512, and 515 to allow for the creation of through routes.

Global output ports 501, 505, 509, and 513 may accept data from B side of crossbar switches 504, 507, 511, and 516 and transmit data on their respective B links In various embodiments, the global output ports may not be used in conjunction with local routes.

It is noted that the port configuration of the node illustrated in FIG. 5B is merely an example. In other embodiments, different numbers, and configurations, and interconnections of ports may be possible.

Figure 6:
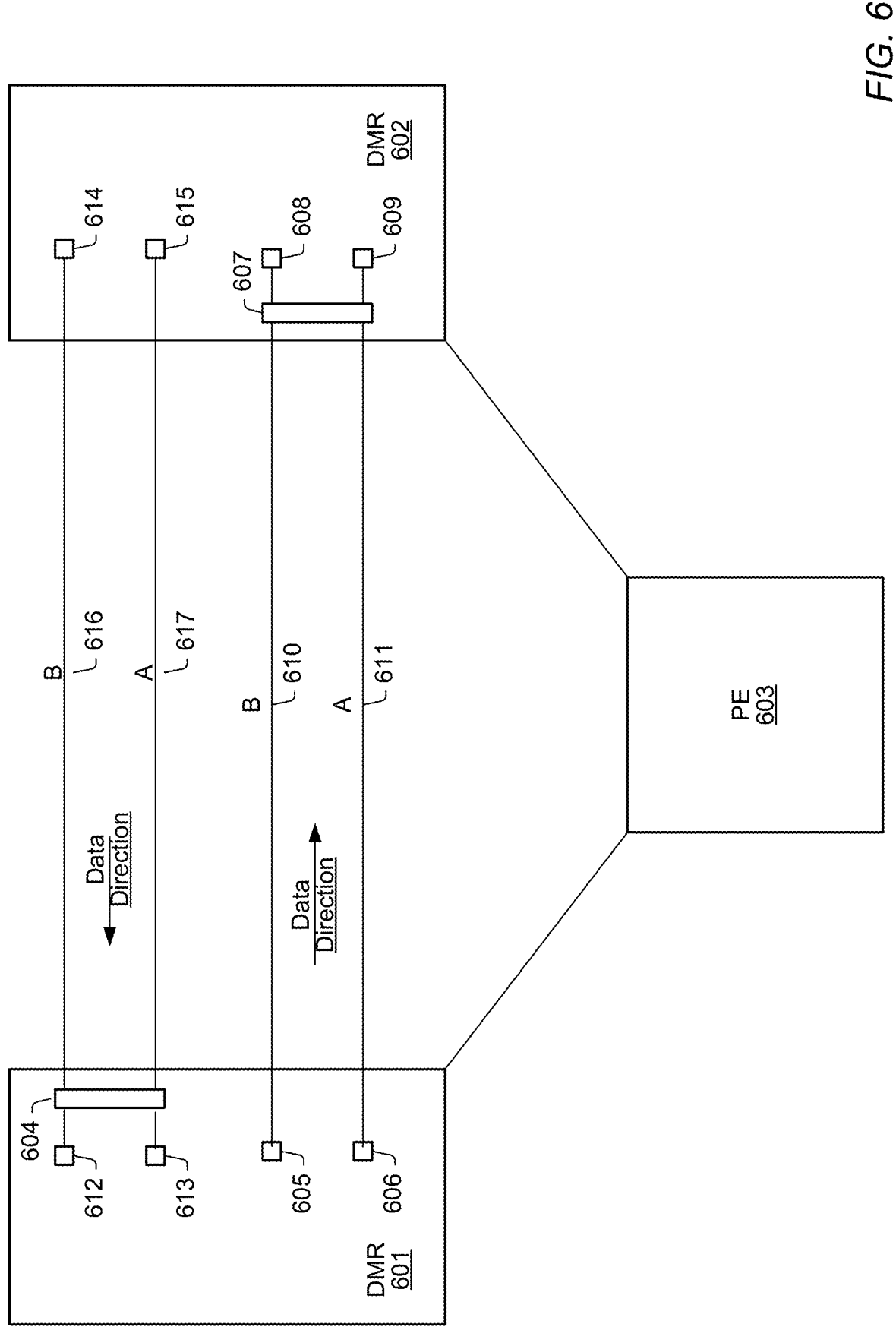
FIG. 6 is a block diagram illustrating connections between DMRs and a PE in a portion of a multi-processor array.

An embodiment of a portion of a multi-processor array is illustrated in FIG. 6. The illustrated embodiment includes DMR 601 coupled to DMR 602 through local link 611 and global link 610. DMR 601 is further coupled to PE 603, and DMR 602 is also further coupled to DMR 602.

In DMR 601, global link 610 and local link 611 are coupled to crossbar switch 604, which is further coupled to global port 605 and local port 606. In DMR 602, global link 610 and local link 611 are coupled to crossbar switch 607, which is further coupled to global port 608 and local port 609.

During operation, data transmitted from local port 606 of DMR 601 may be coupled to local link 611. In our example the crossbars are only on the input port side. Alternatively, data transmitted from global port 605 may be coupled to local link 611 or to global link 610 by crossbar switch 604. Again, data from global port 605 can only go out on global link 610. In a similar fashion, data received by DMR 602 via global link 610 may be routed to either local port 608 or global port 609 through crossbar switch 607. It is noted that crossbar switch 604 only has two active states of straight or crossed. For example, when global link 610 is connected to local port 608 then local link 611 can only be connected to global port 609, and when global link 610 is connected to global port 609 then local link 611 can only be connected to local port 608.

It is noted that embodiment of a node-to-node link in an IN of a multi-processor array illustrated in FIG. 6 is merely an example. In other embodiments, different numbers and types of connections between DMRs are possible and contemplated, including bidirectional and time shared connections.

Figure 7:
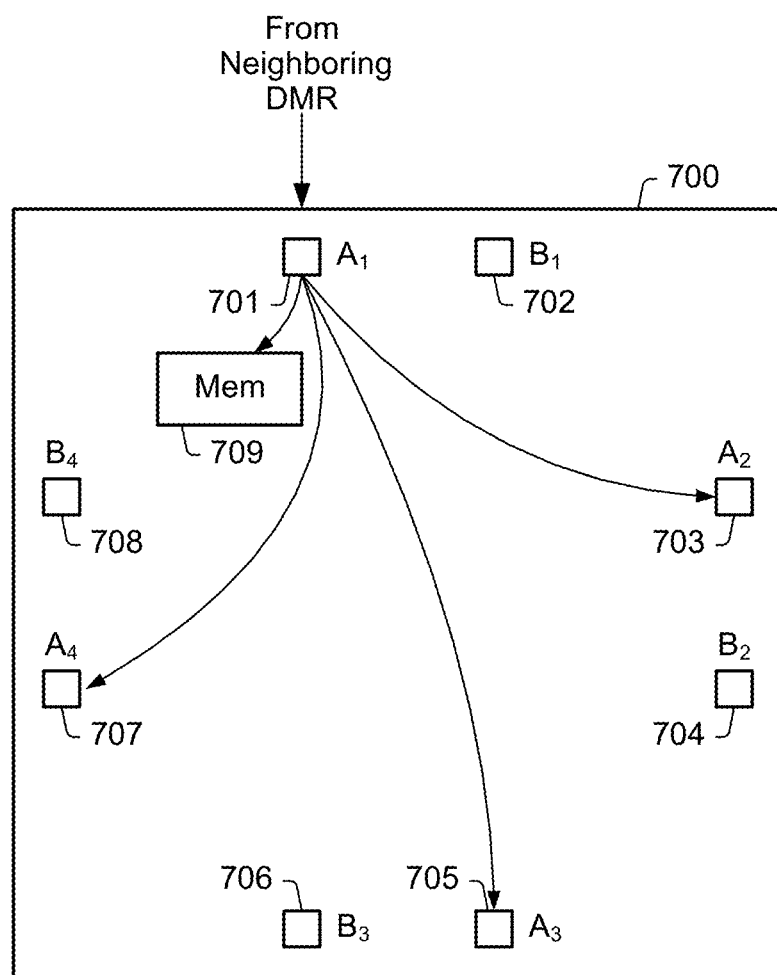
FIG. 7 is a block diagram illustrating example local routes within a DMR.

A block diagram depicting possible internal routes within a DMR is illustrated in FIG. 7. In the illustrated embodiment, DMR 700 includes local ports 701, 703, 705, and 707, and global ports 702, 704, 706, and 708. DMR 700 further includes local memory 709. In the embodiment illustrated in FIG. 7, local port 701 is coupled to local ports 703, 705, and 707. Local port 701 is further coupled to local memory 708. In some embodiments, the aforementioned coupling may be set up by an RCM as described in more detail above, and the coupling may allow through-routes in DMR 700. For example, data transmitted from a neighboring DMR to local port 701 may be passed through the output portion of any of local ports 703, 705, and 707. Additionally, data received through local port 701 may be stored in local memory 709. The number of ports and their arrangement and internal routing illustrated in FIG. 7 is merely an example. In various embodiments, different number of ports and different configurations of internal routing may be employed.

Figure 8:
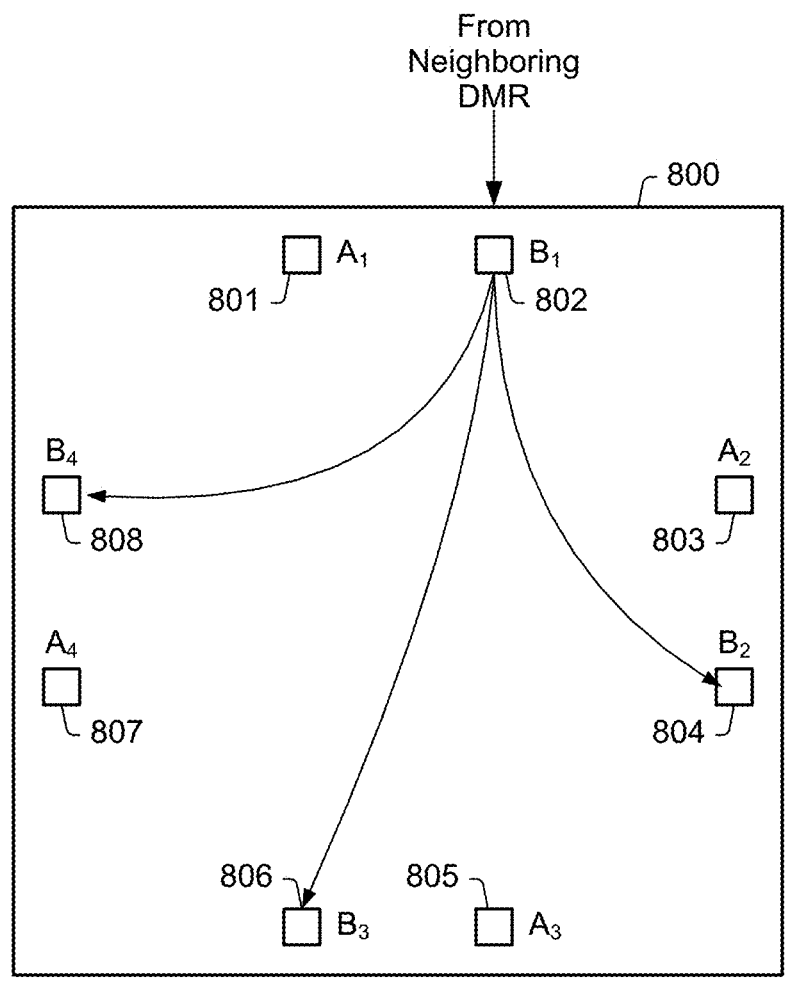
FIG. 8 is a block diagram illustrating example global routes within a DMR.

A block diagram depicting possible global routes within a DMR is illustrated in FIG. 8. In the illustrated embodiment, DMR 800 includes local ports 801, 803, 805, and 807, and global ports 802, 804, 806, and 808.

In the embodiment illustrated in FIG. 8, global port 802 is coupled to global ports 804, 806, and 808. In some embodiments, the aforementioned coupling may be setup by an RCM as described in more detail above, and the coupling may allow through-routes in DMR 802. For example, data transmitted from a neighboring DMR to global port 802 may be passed through the output portion of any of global ports 804, 806, and 808.

The arrangement of ports illustrated in FIG. 8 is merely an example. In other embodiments, different numbers of ports and different arrangements of ports are possible and contemplated.

In the embodiments described above and illustrated in FIGS. 4-8, the input switch control logic may have configurable priorities. A table depicting example input switch control priorities is illustrated in FIG. 9. For incoming pathway routes that are programmed to remain on local (layer A), input router port A may have a higher priority than input router port B. In the case of incoming global (layer B) routes, input router port B may have a higher priority than input router port A. However, when input router port A and input router port B request the same resource, dependent upon the type of request, the higher priority port may control the input switch state and thereby the access to the resource, and the lower priority port may follow if the requested resource is available, or it may stall if the resource is unavailable. Such priorities are depicted in the table illustrated in FIG. 9.

The routing table of FIG. 9 corresponds to a semi-automatic mode of the example routing protocol that allows the layer switch control logic hardware to make layer switching selections during pathway setup based on the current state of the node and the directional switching requests presented to it. This mode is advantageous to processing flits that contain minimal sized nunits that only specify direction requests, and in some cases it may avoid blockages from other pathways.

The non-automatic mode of the example routing protocol may not allow the control logic hardware any freedom to make selections of data path switches (layers or directions), and instead require the selection to be encoded in the current nunit of the arriving header flit. This mode may require larger nunits than the semi-automatic mode, and these may be accommodated with proportionately more header flits to set up a wormhole routed communication pathway. This mode is advantageous to the precise control of pathway location by a software development tool suite, which has a much wider view of the ensemble of paths needed by an application software, and is better equipped to avoid blockages and in-feasible ensembles of pathways than would be obtained with path selection blind to other pathways.

The use of configurable control logic for the layer and direction switches supports multi-mode routing protocols. In the example HyperX DMRs the current configuration is held by a register in the DMR that is R/W accessible to application software. Each DMR may be configured independently of the other DMR, so it is possible that a header flit to set up a worm-routed pathway will have nunits of mixed sizes, depending on the expected mode setting of the DMRs that it is intended to encounter.

Stall Retry

It is noted the crossbar switch may implement all cases of inbound pathway setup, except the case when both ports (A and B) request a local (layer A) access. When both ports request a local access, the crossbar switch may stall input router port B. In some embodiments, the crossbar switch may allow access, but downstream fabric priority logic may stall the request. In order to minimize the impact on timing, the crossbar switch may be designed to switch to the proper state based on minimum logic that uses only the current header flit requests and crossbar state. No additional downstream stalling is considered. This may give rise to cases where a potentially bad decision may be made based on the limited look at the state.

The cases can all be described by a single set of conditions which are:

The input crossbar is not currently "locked" on an existing active transaction.

A global request is made by an arriving first header flit on either the A and/or B port.

Based on the priority scheme, the first header flit may be placed on the B' (global) bus and sent to the Goport logic.

This Goport logic is either already in use by another pathway (from a different direction) or is receiving a second header flit request in the same cycle from a direction with a higher priority.

Under these conditions, the first header flit will be stalled downstream from the input crossbar and so it will have to wait for the Goport to become available.

In such cases, it is possible that the Outport (layerA) associated with the requested route direction is available for a global route but the logic would be too complex to execute in a single cycle to detect that. In such cases, a "stall and retry" tactic may be employed. When the aforementioned conditions occur, the request may be stalled; and the during the same complete clock cycle all the necessary logic may be evaluated to determine if a different decision by the layer switch input crossbar will provide a clear path. If that is the case, then the relevant information may be registered at the next rising clock edge and a retry may be evaluated in conjunction with any new requests. When no new requests (on the same or other ports) conflict with the retry, then the retry may be granted and the route may be completed on the alternate path.

The aforementioned method provides full use of the global route fabric as if all of the conditions were considered in the first request cycle without over-taxing a cycle's logic in such a way as to cause a critical speed path. The route set-up is still deterministic, based on the current conditions in the fabric, but a route may take additional cycles to traverse a DMR when a retry is necessary.

The priorities depicted in the table illustrated in FIG. 9 are merely examples. In other embodiments, different priorities are possible and contemplated. It is further noted that in various embodiments, the crossbar may be controlled by hardware or software (such as, e.g., nunit/flit programming and control registers), or a combination thereof.

Figure 10:
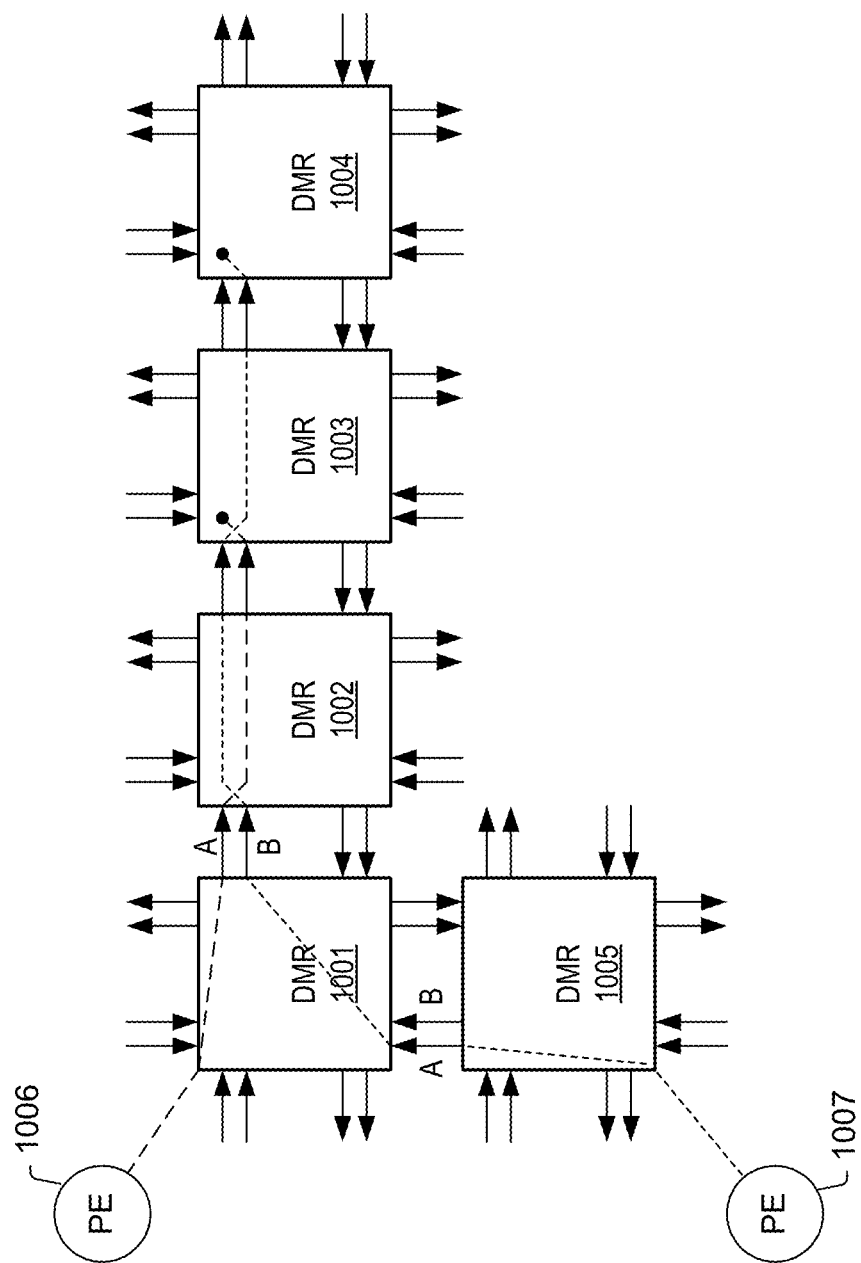
FIG. 10 is a diagram illustrating the operation of one embodiment of global and local routing within a multi-processor array.

An example of multi-layer routing is illustrated in FIG. 10. In the illustrated embodiment, PE 1006 creates a worm header to route from an east port of DMR 1001 to a west port of DMR 1003. The route originates from router port A or DMR 1001 and then travels to DMR 1002. Upon reaching DMR 1002, the layer-switch input crossbar in DMR 1002 decides to send the worm onward using router port B (a global port) onto DMR 1003. Upon reaching DMR 1003, the layer switch in DMR 1003 switches the route back to the local (layer A) input port, allowing the wormhole path to terminate there.

Also illustrated in FIG. 10 is a worm route created by PE 1007 to go from a north port of DMR 1005 to a west port of DMR 1004. This route originates from router port A (north) of DMR 1005. As described above in reference to the priority table illustrated in FIG. 9, the route switches to router port B (east) of DMR 1001. The route switches to router port A (west) of DMR 1002 due to the fixed state of the input crossbar switch (e.g., the crossbar switch is already set in a direction by the route established by PE 1006 as described above). For similar reasons, the route switches back to the global routing level (level B) at DMR 1003. The route exits DMR 1003 and enters DMR 1004 via router port B and then is switched to the local input route port where the wormhole routing terminates.

It is noted that routes depicted in FIG. 10 are merely examples. In other embodiments, different numbers of routes and different routes paths are possible.

Security Bypass Routing

Areas of an MPA chip may need to be secured from other areas of an MPA chip. For various reasons, one area of an MPA may contain sensitive data related to device control, IP licensing, user authorization, etc., or running an algorithm critical to proper operation. Meanwhile another area of the MPA may be executing software that has not been validated as secure. Non-validated software may be present for a variety of reasons (it may be new and with plenty of bugs, or the source code is unavailable for security validation, or it may be so large and complex that it is un-economic to validate). Non-validated software may contain viruses or spyware.

Figure 8A:
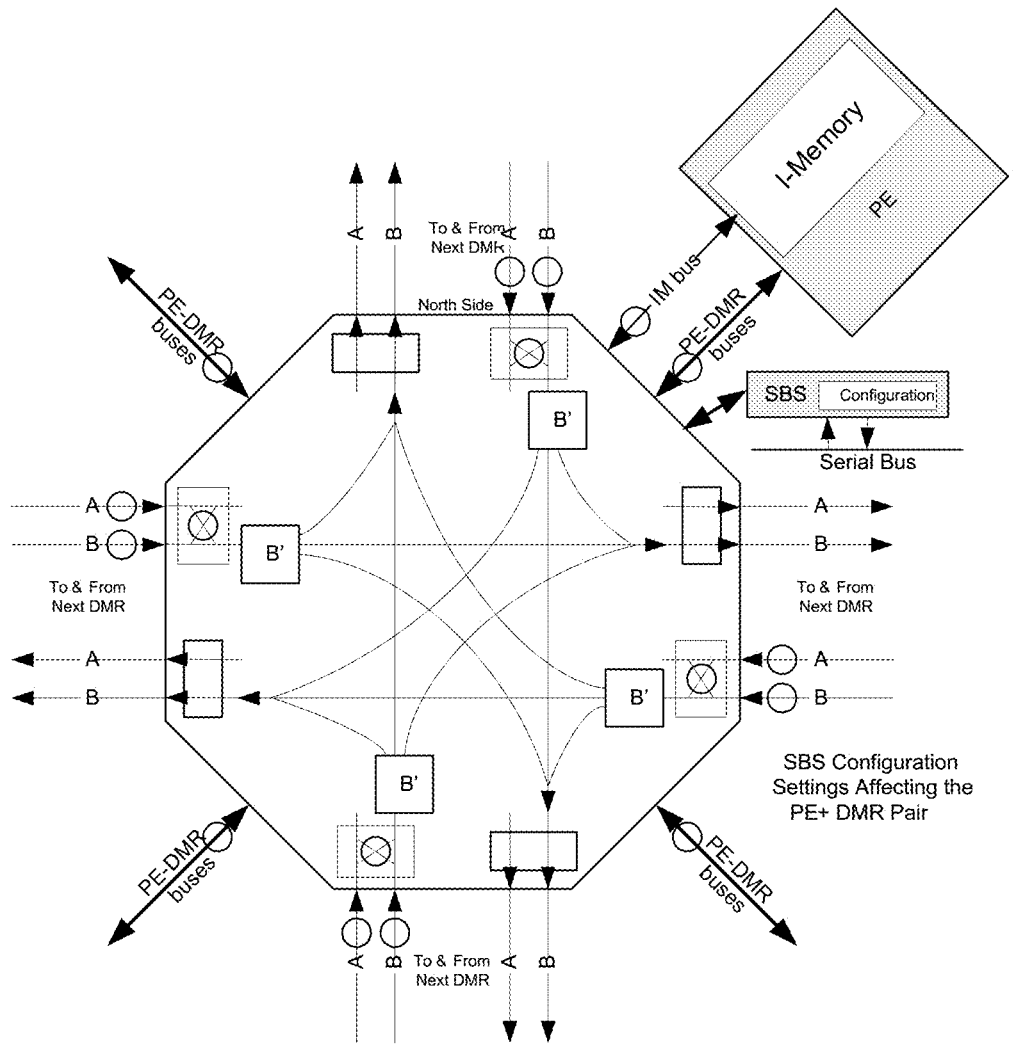
FIG. 8A is a block diagram illustrating an embodiment of a DMR.

A wormhole-routed communication path may be designed to be sourced in one area, to probe another area, and to copy-in or copy-out data or instructions. To prevent this sort of probing, the links and ports of a DMR may be designed such that they may be configurably disabled, see U.S. patent application Ser. No. 13/274,138, referenced above. In one embodiment the DMR links and ports involved are shown in FIG. 8A wherein circular features are points where message traffic can be disabled. Also shown in FIG. 8A is a configuration register in the SBS interface to the serial bus that may be designed so that individual bits may be written to disable each of the DMR ports/links. The serial bus may be a low-bandwidth secondary interconnection network (SIN) on the chip that may be used for configuration and debug purposes.

Figure 19:
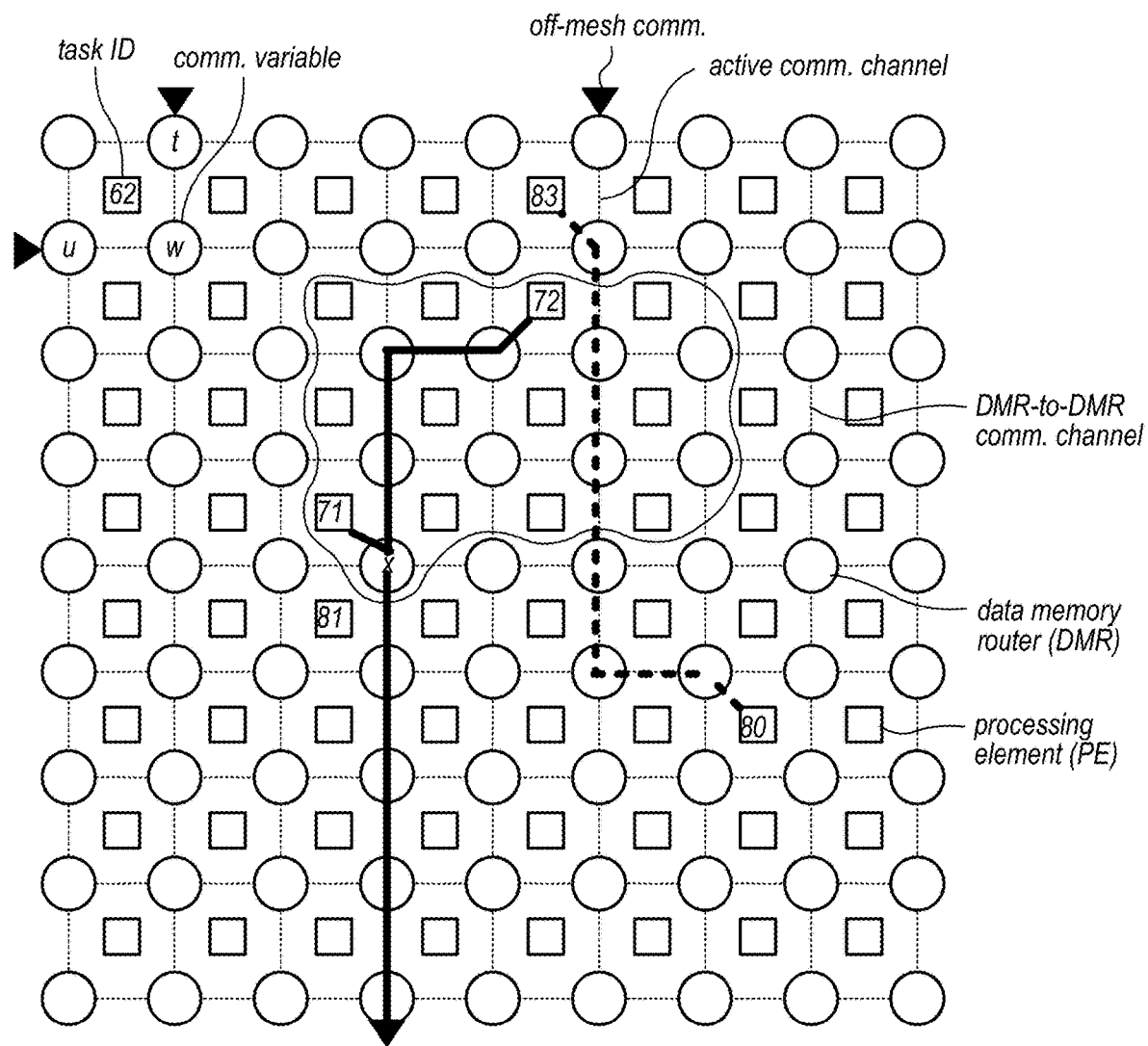
FIG. 19 depicts a block diagram illustrating an example pathway through a portion of a MPA that crosses a secured area.

FIG. 19 shows an MPA with an area delineated by a freehand boundary that may be secured by disabling communication pathways at the boundary. Communication paths within the secured area are not affected by the disabled communications at the boundary. However, the bounded area is large enough that it gets in the way of communications between PE on either side of the secured area. Thus there is a need for a way to route unsecured messages across the secure area without violating its security (referred to herein as "Secure Bypass Routing").

Secure Bypass Routing may be achieved by designing a DMR to be able to configurably limit worm-messages from connecting to the local memory and PE ports, but to allow bypass over secured areas. A DMR may be designed such that memory and PE ports connect directly to only the local layer-A data paths, and not to other layer data paths, except indirectly through the layer switches (input crossbars). In this DMR embodiment the worm-message layer switching is limited to the input crossbars, and a way to prevent a worm-message from switching layers in a DMR is to lock the crossbars into the straight-through state.

For a two-layer IN the crossbars have only two states (through or crossed). When these crossbars are locked in the through state, then any inbound worm-message is constrained to exit the crossbar on the same layer. In the embodiment illustrated in FIG. 5A, worm-messages inbound on the local layer-A may exit on the layer-A OUTPORT or they may terminate at the INPORT. Worm-messages inbound on the global layer-B may only exit on the layer-B GOPORT.

For three and more layer INs the crossbars may have many states and may include the connection of any input layer to the local layer-A. If these "connect to local INPORT" states are the ones locked off, then inbound worm messages on upper layers may switch layers but be excluded from INPORT, thus keeping INPORT secure. In some situations it may be desirable to allow some of the upper layer inbound communication pathways to reach the DMR INPORTs, and this can be accommodated with more programming bits in the DMR configuration register.

An unsecured communication pathway over a secure region is illustrated in FIG. 19 where the dotted line depicts a route that passes on the global (layer B) links over a secured area; and it does not originate or terminate within the secured area.

Figure 20:
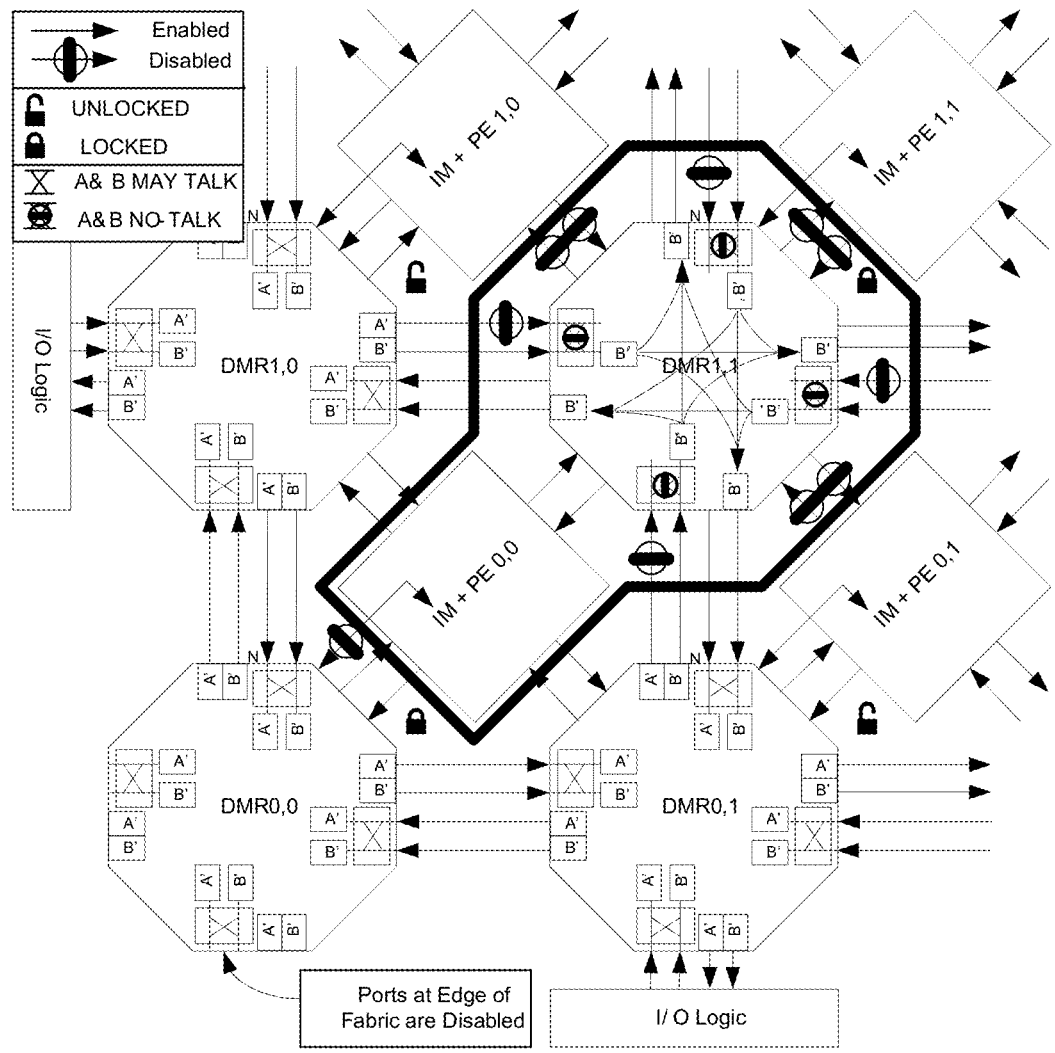
FIG. 20 depicts a block diagram illustrating an embodiment of a portion of a MPA with disabling of communication pathways.

In the embodiment illustrated in FIG. 20, the sequence of events to create a bypass over a secure region is described in the following example. It is noted that in the example, the term "config-reg" is an abbreviation for configuration register:

Secure PE(0,0) and DMR(1,1) with Route-over.
Set up PE (0,0)—load its IM then secure from further R/W Set SB S(0,0) config-reg to reset PE(0,0) if needed
Write all IM of PE(0,0) through the SB and optionally validate
Set SBS(0,0) config-reg bits to disable the IM bus and lock the SBS config-reg
Optionally read SBS config-reg to confirm it is locked Set up DMR(1,1)
Set SBS(1,1) config-reg bit to reset DMR(1,1) if needed
Optionally initialize DMR(1,1) and validate
Set SBS(1,1) config-reg bits to disable North and East ports and the IM bus and lock the config-reg
Optionally confirm SBS config-reg and IM bus are locked.
Disable all A ports and set input crossbar locker bit.
Disable PE buses NE, NW, SE; and lock configuration.
DMR (1,1) is secure because only PE(0,0) has read or write access to its DM or registers and PE(0,0) is secured; and messages arriving at the DMR ports or SBS are ignored.
After securing PE(0,0) and DMR(1,1) there are many possible bypass routes that will not interact with them. For example, PE(1,0) using a Quick port in DMR(2,0) (not shown) located north of DMR(1,0), may write header flits to the DMR(2,0) South Quick Port that arrive at DMR(1,1) on the A layer and then are switched to the B' layer. The bypass route may continue on the link to DMR(1,1) on the B layer. Inside the DMR(1,1) the bypass route may go North, South, or East according to the nunit information in the header flits. Suppose a nunit selects South, then the bypass route would continue on to DMR(0,1) where it may continue on the B layer or, now that it is outside the secure area, it may switch to the A layer and continue to route or terminate.

The control logic and the data-path switching to implement a protocol in the example HyperX DMR nodes are implemented in two stages—first the layer-switching crossbar, and then the directional-switching router. Alternatively in other implementations the directional switching could come first and the layer switching second. These two stages may be integrated together into a unified switch in other implementations. Alternatively the protocol and switching may be implemented with more than two stages.

The example DMR router implementation has a layer-switch (input crossbar) that is a two-layer version of a multi-layer switch, while the example directional switch is a three-direction version of a multi-directional switch. This invention does not limit either of these switch components to the number of layers and directions of this example DMR implementation. The concept may easily be extended to many layers and many directions with minor modifications to the example implementation. These extended forms support additional IN connection dimensionality.

The wormhole routing methods described here and used in the example HyperX architecture provide for an infinite address space by using continuation header flits. For short distance communications a single header flit may be all that is required. When the DMR encounters a first header flit with only one non-termination nunit, then the DMR may perform the nunit specified direction selection, discard the first flit, promote the second flit to first flit and send the worm message onward to the next DMR. Very long headers may be composed if required to traverse an MPA spread across many f MPA chips. Finite addressing of worm message headers uses a fixed number of bits to specify the worm's destination address. Finite addressing does not interfere with the multilayer methods described here for low dimensional INs, but it may become less efficient as the IN dimensionality increases.

In order to provide automatic detour routing, the routing engine may use information about the route congestion both locally and more globally to allow it to detour a route around pockets of congestion. A pathway route may be planned and programmed into header flits as usual, and then if congestion is encountered along the way, an unplanned detour may be made to avoid it. The routing control mechanism of an IN node may compute a detour either alone or in conjunction with information from neighboring nodes, either local or global. A node may add nunits or header flits as required to achieve the detour, after which the worm-message may continue on its pre-planned route to its destination. If temporal knowledge is also included in the route information then the estimated duration of congestion can also be used as part of the determination of the path. Overall this is a congestion avoidance adaptation on the fixed path methods previously described.

Figure 22:
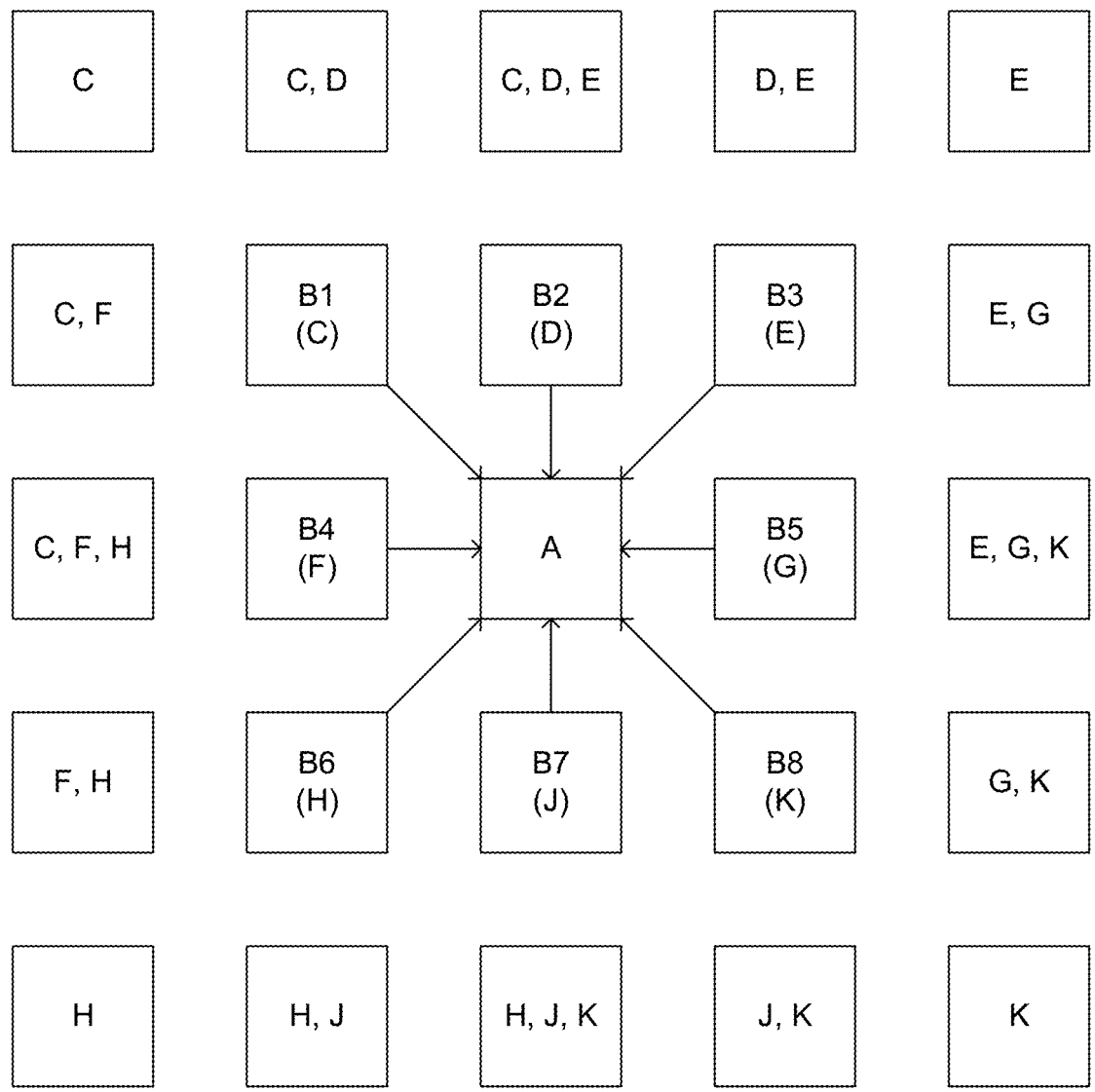
FIG. 22 depicts a block diagram illustrating a distributed congestion analyzer.

Congestion may be determined according to the method illustrated by the block diagram in FIG. 22. In this diagram, the square boxes represent DMRs. The DMR in the center, labeled "A", is able to make decisions on congestion by gathering congestion information from its neighbors in the following way. The surrounding DMRs (B1-B8) may provide metrics on both local and global congestion information to DMR A. A single metric from DMR B1 to DMR A tells DMR A about the level of congestion DMR B1 is observing itself. This is the local congestion metric. DMR B1 also provides a global congestion metric to DMR A by gathering information from its neighboring DMRs that are not neighbors of DMR A. These have been marked "C" in FIG. 22. Similarly, DMR B2 provides a local congestion metric to DMR A. It also provides a global congestion metric to DMR A by gathering information from its neighboring DMRs that are not neighbors of DMR A. These have been marked "D" in FIG. 22. This repeats for all of the neighbors of DMR A as indicated in FIG. 22. Note that this method of determining congestion can be expanded in multiple dimensions and can use information from further away neighbors to determine global congestion as required by the topology of the PIN and the needs of the algorithm calculating the automatic detour routing Link Bandwidth Improvement There are several methods of increasing the bandwidth on any link between two DMR units. One way is to increase the number of trace (wire) connections per link. Another is to run the link layers in faster protocols such as double data rate (DDR). Yet another is to include time division multiplexing (TDM) of logical routes on the same physical layer. For TDM it is important to reliably demultiplex the stream of data coming off the link. One way that is straightforward is to increase the number of bits per flit that are sent down the physical link, the added bits being a tag. The tag bits carry a code for the worm-message to which the rest of the bits belong. A tag of n bits may encode up to $2^n$ different worm-messages, each one of unlimited length. Other modes may divide each worm message into packets and apply header flits to each packet. These packet header flits may contain message identifiers and other information to aid demultiplexing.

Direct Memory Access FIFO

Multi-processor arrays (MPAs) such as those described above, may be used to process high-speed data streams with complex algorithms. Such data streams are often continuous and arrive and depart at a constant rate. The PEs, however, are better suited to processing data in memory in a block-at-a-time fashion; so there is a mismatch to the continuous data streams. One solution to this problem is to allocate a portion of memory for use as a buffer memory, also referred to as a buffer. Typically a buffer is specified in application software that is compiled to operate the MPA. A buffer may be allocated statically at compile time or dynamically during operation. Within any particular application software there may be many buffers, used for example for the analysis and synthesis of data streams. As previously described, the term "array" is not meant to imply any dimensionality.

A memory buffer (referred to herein as a "buffer") may provide an elastic quality to a data path within a multi-processor array. For example, a buffer may be able to absorb short-term data rate variations (provided that average input and output data rates are matched). In some applications, it may be necessary to split a high rate data stream into multiple low rate data streams. Alternatively, it may be necessary, in other applications to combine multiple low rate data streams into a single high rate data stream. Such operations may require that there is no loss or duplication of data within any of the data streams.

A PE may be used to store data into the portion of a memory allocated for a memory buffer. The same PE or another PE may be used to retrieve data from the buffer. Such a method of data storage and retrieval, however, underutilizes the capabilities of a PE. A simpler direct memory access (DMA) engine may, in some embodiments, be used to access buffers and move data, thereby freeing the PE to be used for other more complex tasks, or to go idle to conserve energy.

In some embodiments, DMA engines may perform most of the work in transferring data between ports and local memory. When a PIN port contains both an input and output part which may be simultaneously operated, a separate DMA engine may be necessary for each part.

Figure 11:
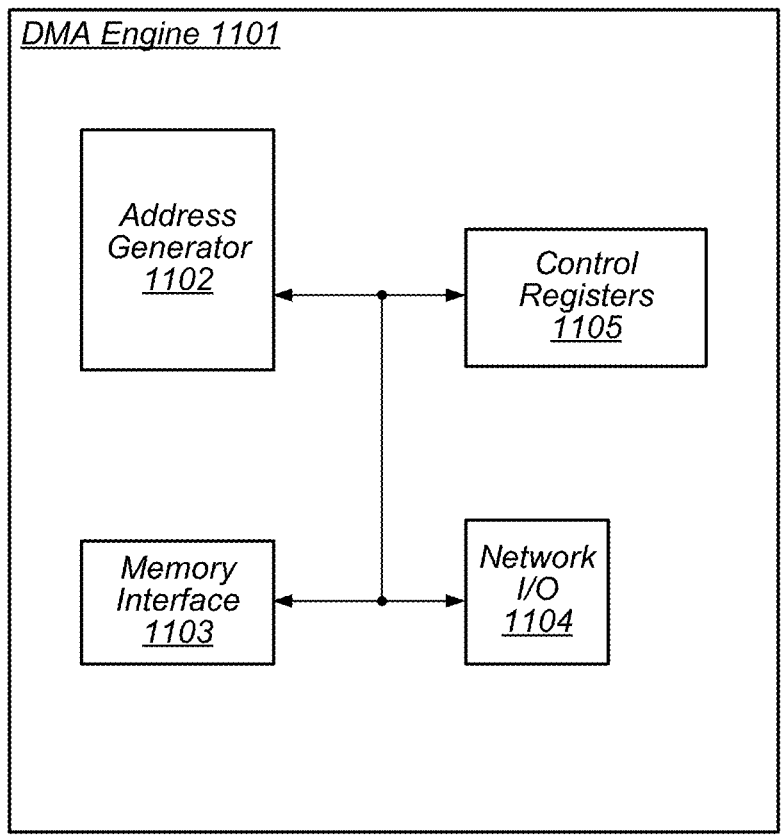
FIG. 11 is a block diagram illustrating a direct memory access (DMA) engine.

Turning to FIG. 11, a block diagram of a DMA engine is illustrated. DMA engine 1101 includes an address generator 1102, memory interface 1103, network I/O 1104, and control registers 1105. Memory interface 1103 may be coupled to an external memory such as a SRAM, for example. In various embodiments, network I/O 1104 may be coupled to external I/O port or any suitable internal port of a multi-processor array.

Address generator 1102 may include a counter designed according to one of many possible counter configurations. In some embodiments, the counter may be configured to reset to a pre-determined value. Address generator 1102 may also include circuits, such as an adder, for example, configured to combine the output the counter with additional data to form address values to be used in accessing a memory. A separate counter configured to store an index value may also be included in address generator 1102.

Control registers 1105 may include one or more latches, flip-flops or any other suitable storage circuit configured to store control information for DMA engine 1101. For example, control registers 1105 may store information that may be used to affect the direction of data transfer, starting address, the increment between address values (commonly referred to as a "stride"), and the like. In some embodiments, control information may be written into control registers 1105 due an initialization or boot procedure for a multi-processor array.

Memory interface 1103 may be configured to employ one of various memory interface methods. In some embodiments, memory interface 1103 may provide a timing signal, such as a clock, for example, a mode selection signal, an address value, and input data values to a memory external to DMA engine 1101. The external memory may reside within or be external to a multi-processor array. In various embodiments, the external memory may include dynamic random access memory (DRAM), SRAM, read-only memory (ROM), or non-volatile memory such as, e.g., FLASH.

It is noted that the embodiment of a DMA engine illustrated in FIG. 11 is merely an example. In other embodiments, different functional blocks and different configurations of blocks are possible and contemplated.

Protocols may be used to coordinate data input to and output from a buffer. Such protocols may prevent data from being overwritten in a buffer, and in other embodiments, prevent the duplication of data within a buffer. Protocols may be classified by the input to output data sequence. There are two primary sequences: First in, First out (FIFO), and First in, Last out (FILO). In a FIFO, the order of the data may not be changed, while in a FILO, the data order may be reversed.

Figure 12:
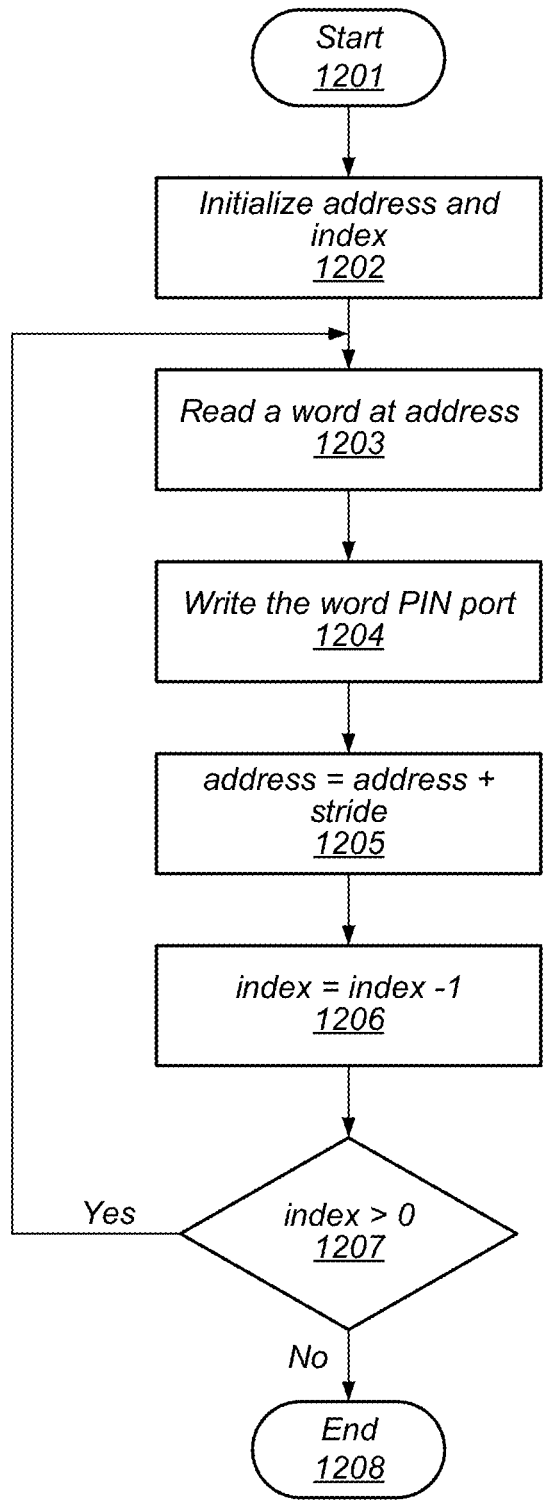
FIG. 12 is a flowchart illustrating a method for operating a memory buffer.

Turning to FIG. 12, an embodiment of a method for operation a DMA engine is illustrated. Referring collectively to FIG. 11 and FIG. 12, the method begins in block 1201. An initial address and index are then initialized (block 1202). In some embodiments, the initial address may be loaded into a counter in address generator 1102. The initial index value may also be stored in another counter included in address generator 1102.

A word of data may then be read from the memory (block 1203). In some embodiments memory interface 1102 may access a memory external to DMA engine 1101 using the address value provided by address generator 1103. The data read from the external memory may be temporarily stored in memory interface 1102. The read data word may then be written to a PIN port (block 1104). The data word may, in various embodiments, be transferred from memory interface 1102 to network I/O 1104 for output to a PIN port.

The current address is then incremented (block 1205). In some embodiments, the current address may be incremented by a stride value, which may be stored in one of control registers 1105. The index value is then decremented (block 1206). The amount by which the index value is decremented may, in some embodiments, also be stored in control registers 1105. The method then depends on the decremented index value (block 1207).

When the decremented index value is greater than a pre-determined threshold value, a new word of data is read from memory using the incremented address value (block 1203), and the method continues as described above. When the decremented index value is less than or equal to the pre-determined threshold value, the method concludes (block 1208). In some embodiments, the pre-determined threshold value may be zero, although other values are possible.

It is noted that the method illustrated in FIG. 12 is merely an example. In other embodiments, different operations and different order or operations are possible and contemplated. Additionally, the terms "increment" and "decrement" are not intended to limit the associated operations to addition and subtraction, since addition of a negative number provides the same result as a subtraction and the subtraction of a negative number provides the same result as an addition. A similar lack of limitation on the terms "greater than" and "less than" is also intended.

Figure 13:
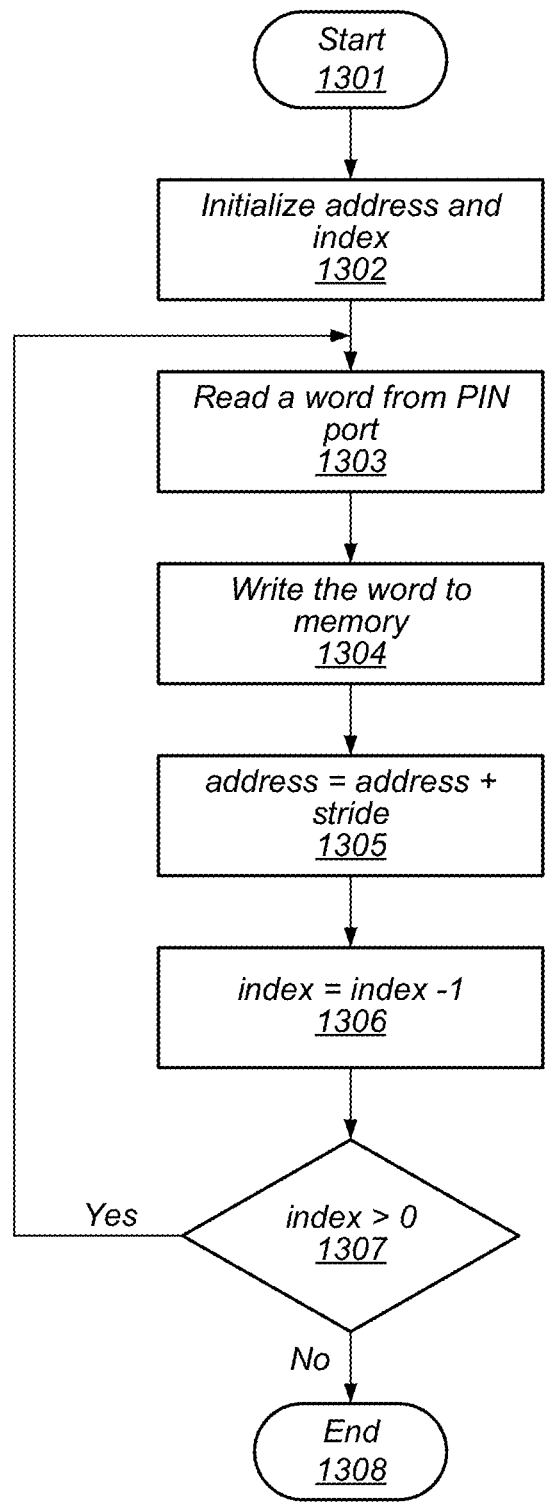
FIG. 13 is a flowchart illustrating another method of operating a memory buffer.

In FIG. 13, another method of operating a DMA engine is illustrated. Referring collectively to FIG. 11 and FIG. 13, the method begins in block 1301. An initial address and index are then initialized (block 1302). In some embodiments, the initial address may be loaded into a counter in address generator 1102. The initial index value may also be stored in another counter included in address generator 1102.

A word of data may then be read from a PIN port (block 1303). In some embodiments, the data word may be received by network I/O 1104 and transferred to memory interface 1103 for temporary storage. The received data word may then be written to a memory (block 1304) using the address value provided by address generator 1102.

The current address is then incremented (block 1305). In some embodiments, the current address may be incremented by a stride value, which may be stored in one of control registers 1105. The index value is then decremented (block 1306). The amount by which the index value is decremented may, in some embodiments, also be stored in control registers 1105. The method then depends on the decremented index value (block 1307).

When the decremented index value is greater than a pre-determined threshold value, a new word of data is read from memory using the incremented address value (block 1303), and the method continues as described above. When the decremented index value is less than or equal to the pre-determined threshold value, the method concludes (block 1308). In some embodiments, the pre-determined threshold value may be zero, although other values are possible.

It is noted that operations of the method illustrated in FIG. 13 are depicted as being performed in a sequential fashion. In other embodiments, the operations may be performed in parallel or in a different order.

During operations of a DMA engine such as those illustrated in FIG. 12 and FIG. 13, caution should be exercised to prevent the data overwrite or data duplication in a memory. In some embodiments, the DMA engine may stall, i.e., not execute a read or write operation, when either a PIN or local memory cannot accept data from or provide data to the DMA engine. In such cases, the DMA engine may store recently read or written data words in registers for use at a later time. Information regarding the stall may also be propagated from the port side of the DMA engine to the memory side of the DMA engine and vice versa. For example, a busy indication from the PIN port may stall the DMA engine from making read or write requests through its memory interface.

A data stream may be longer than the size of a buffer. In such cases, it may be necessary to coordinate the input of data (fill) process and the removal of data (drain) process to prevent the loss or duplication of data. In some embodiments, two buffers (one being filled and the other being drained) may be employed. This technique is commonly referred to as "double-buffering." During operation, when the buffer being filled becomes full, an input data stream may be switched to the buffer being drained. A similar switch occurs when the buffer being drained becomes empty; the output stream is then read from the buffer being filled. The process of the buffers switching roles is often called a "swap of buffers," and may be implemented through an exchange of pointers to buffer memory addresses. In some embodiments, use of two buffers may be collapsed into a single buffer using a more sophisticated controller to keep track of which address is being written to and which address is being read from.

A form of fixed multiplexing can be accomplished with the DMA FIFO logic. Because the DMA engines are physically much smaller than a DMR, a DMR may contain multiple DMA write engines and multiple DMA read engines. The coupled control of multiple DMA engines working on the same buffer allows multiple data streams to be combined into one output stream or the reverse, a single input data stream can be split into multiple output data streams. Also the coupled control of multiple DMA engines may include coordination with flow control logic to prevent loss or duplication of data. With a fixed interleave pattern, the design of the coupled control is relatively straightforward; and simplifications of the control logic may be made if the lengths of packets in the input streams are all the same; however, these are not limitations of the invention.

As described above, a controller may be employed to coordinate the multiple DMA engines accessing a single FIFO buffer memory. The controller may be configured to allow multiple DMA engines to read from the FIFO buffer memory while another DMA engine is writing to the FIFO buffer memory. The number of DMA engines performing a read operation (DMAR) may be dependent upon the number of bi-directional PIN ports facing memory from the nearest PIN node. Such a configuration may provide flexibility to support data division and re-ordering using only DMA engines, i.e., no PE are necessary.

To support data re-ordering and division of a data stream, support for multiple read strides may be necessary. Support for multiple write strides may also be employed at the cost of additional hardware complexity. In some embodiments, the latency of the data transit through the system of buffer and multiple DMA engines may be adjusted in tradeoff with logic circuit complexity and power dissipation.

A DMA controller for multiple DMA engines may be configured to support one-time and continuous DMA, single-write with multiple read, and single-read with multiple write. In some embodiments, FIFO buffers used in conjunction with a DMA controller and multiple DMA engines may be "fully protected" in hardware, i.e., no additional software control is necessary once the controller and its associated DMA engines have been configured.

The controller for multiple DMA engines may be composed of logic circuits configured for pointer comparison and stall condition detection, and these circuits may be constructed in a modular fashion in various embodiments. For example, the logic circuits may be configured to support a single FIFO buffer operation. The logic circuits may then be replicated any number of times necessary to support a desired number of FIFO buffer operations. In various embodiments, the number of address bits used for comparison may be adjusted dependent upon power dissipation requirements.

Figure 14:
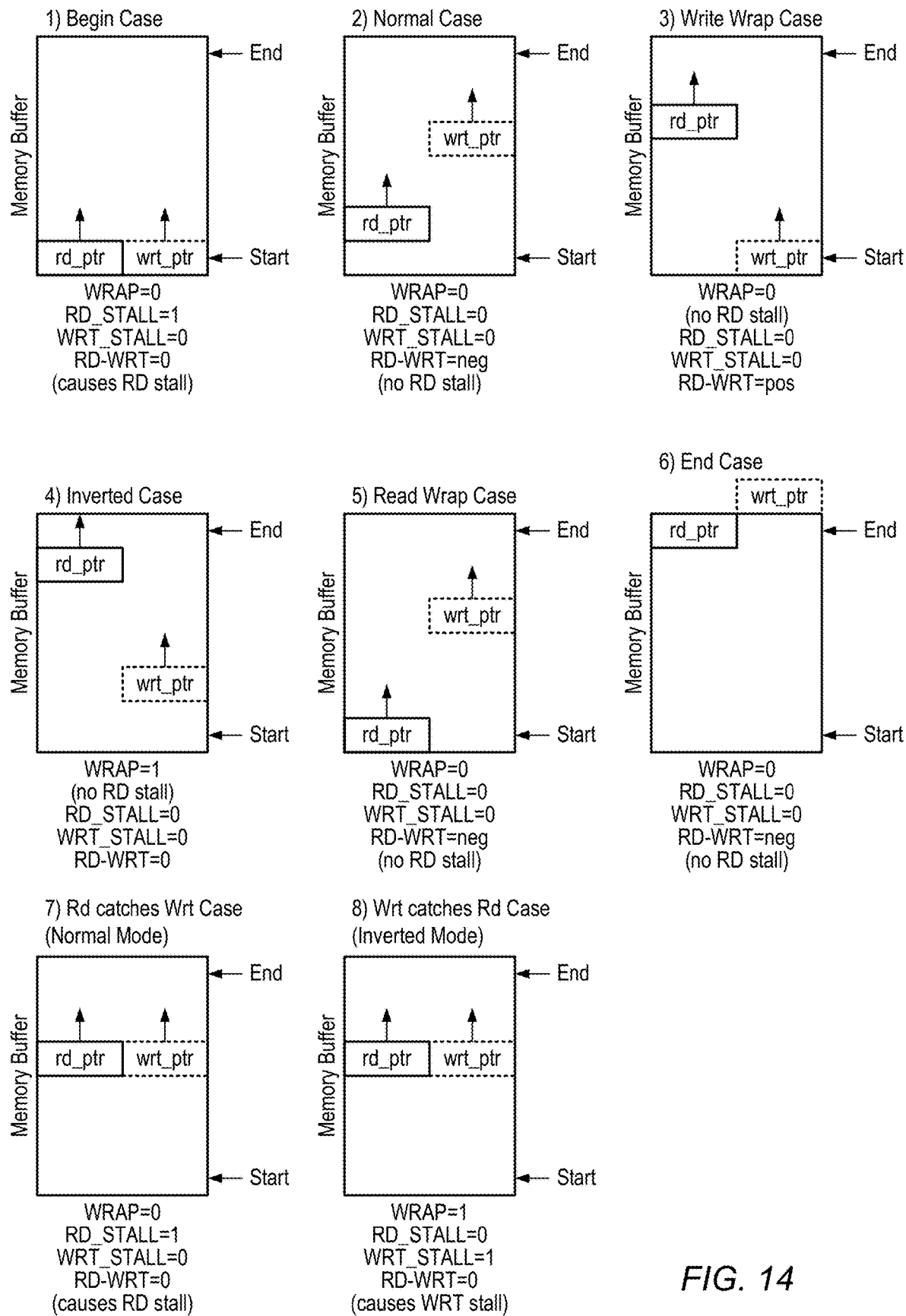
FIG. 14 is a chart illustrating various pointer configurations.

Turning to FIG. 14, a diagram depicting possible configurations of pointers for a single-read single-write implementation is illustrated. It is noted that although the diagram illustrated in FIG. 14 depicts the single-read single-write case, other implementations, such as two-read single-write, for example, are possible and contemplated.

In each of the cases depicted in FIG. 14, the WRAP value is used to indicate that the write pointer has wrapped back around to the beginning of the FIFO in the continuous DMA mode. When the write pointer has wrapped, the read pointers associated with the buffer, may continue to the end of the FIFO and no further checks are required. When the aforementioned read pointers reach the end of the buffer, the WRAP value is cleared and the FIFO is returned to normal mode. When the WRAP value is equal to zero, the read stall condition is determined by:

((RD_PRT−WR_PRT) is greater than or equal zero)

In cases where the WRAP value is 1, a similar comparison between the read and write pointers will provide a write stall value for non-negative result. The remaining cases depicted in FIG. 14 are non-stalling for both reads and writes.

In the examples illustrated in FIG. 14, cases 1, 2, 6, and 7 are applicable to one-time DMA operation. When a DMA FIFO starts, the read and write pointers are organized in accordance with case 1. Writes are allowed to the FIFO, but reads are stalled. During normal operation (see case 2), the write pointer leads the read pointer and the both reads and writes are allowed. In some cases, the read pointer catches the write pointer (see case 7), resulting in reads being stalled. When a write to the FIFO completes (see case 6), the write pointer may point to address outside of the FIFO, and reads may be allowed to continue until the end of the FIFO has been reached.

In the examples illustrated in FIG. 14, all of the cases, with the exception of case 6, are applicable to continuous DMA operation. When used in the continuous case, a WRAP bit may be maintained for each read/write pointer pair within a FIFO. In some embodiments, more than one of one type of DMA may be compared with one of the other type of DMA (e.g., 4 read, 1 write), resulting in the need for more than one wrap bit. In various embodiments, wrap bits may be employed in different fashions dependent upon the configuration of the DMAs.

In multi-read cases, the wrap bits may be set when the single write pointer wraps, and each of the additional wrap bits may be cleared when its respective read pointer indicates a wrap has occurred. In multi-write cases, a wrap bit may be set as each write pointer wraps, and all of the additional wrap bits may be cleared when the read pointer indicates a wrap.

A single FIFO buffer may include one input and more than one output. In such cases, it may be necessary to compare more than one pointer to determine stall signals for DMA engines connected to the FIFO buffer. In some embodiments, the comparison may be performed in a centralized fashion to avoid duplication of circuitry and additional routing if the comparison function were distributed among the DMA engines that may be connected to a FIFO buffer. In each DMR of a multi-processor array system, one or more functional blocks configured to compare pointers and generate stall signals may be employed. A DMA-FIFO buffer and controller may also be implemented at chip I/O interfaces; including interfaces specialized for external memory chips, such as SDRAM chips. In various embodiments, a FIFO buffer may include any suitable number of input and output ports to connect to higher dimension meshes.

Figure 15:
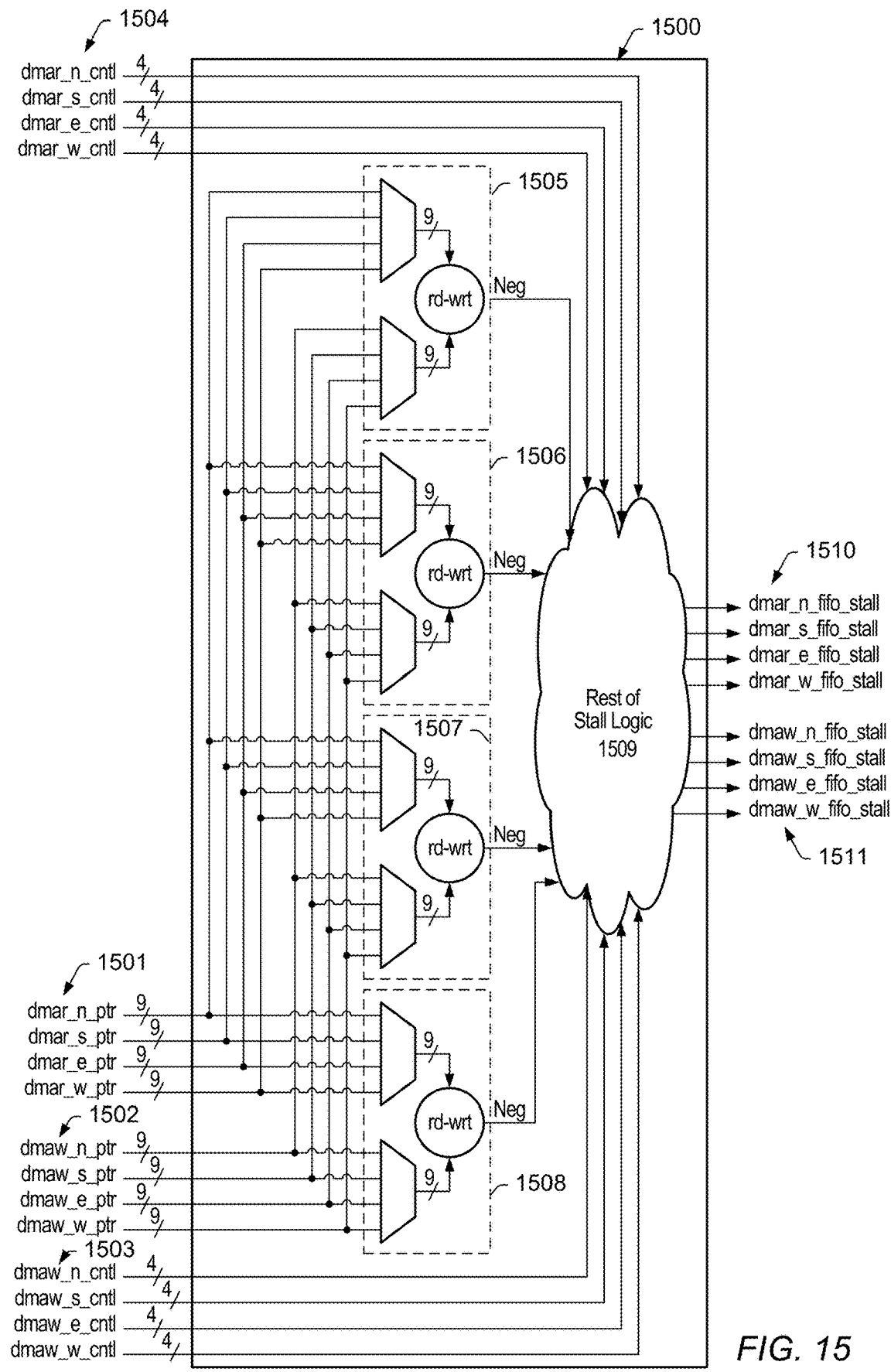
FIG. 15 is a block diagram of an embodiment of a Pointer Compare and Stall unit.

Turning to FIG. 15, an embodiment of a pointer compare and stall unit (PCSU) is illustrated. In the illustrated embodiment, PCSU 1500 includes DMA read pointer inputs 1501, DMA read control inputs 1504, DMA write pointer inputs 1502, DMA write control inputs 1503, DMA read FIFO stall outputs 1510, and DMA write FIFO stall outputs 1511. Although the pointer inputs are depicted as containing 9-bits, and the control inputs are depicted as containing 4-bits, in other embodiments any suitable bit width for each type of input may be employed.

In the embodiment illustrated in FIG. 15, DMA read pointer inputs 1501 are and DMA write pointer inputs 1502 are coupled to comparators 1505 through 1508. In various embodiments, comparators 1505 through 1508 may implement any suitable comparison algorithm such as the difference between the read and write pointers described above. The output of comparators 1505 through 1508 may then be coupled to stall logic 1509. The circuits included in stall logic 1509 may combine the comparator outputs using any suitable logic function, such as, e.g., AND, OR, etc., to form DMA write stall outputs 1511 and DMA read stall output 1510.

It is noted that the PCSU illustrated in FIG. 15 is merely an example. In other embodiments, different functional blocks and different configurations of blocks are possible.

Figure 16:
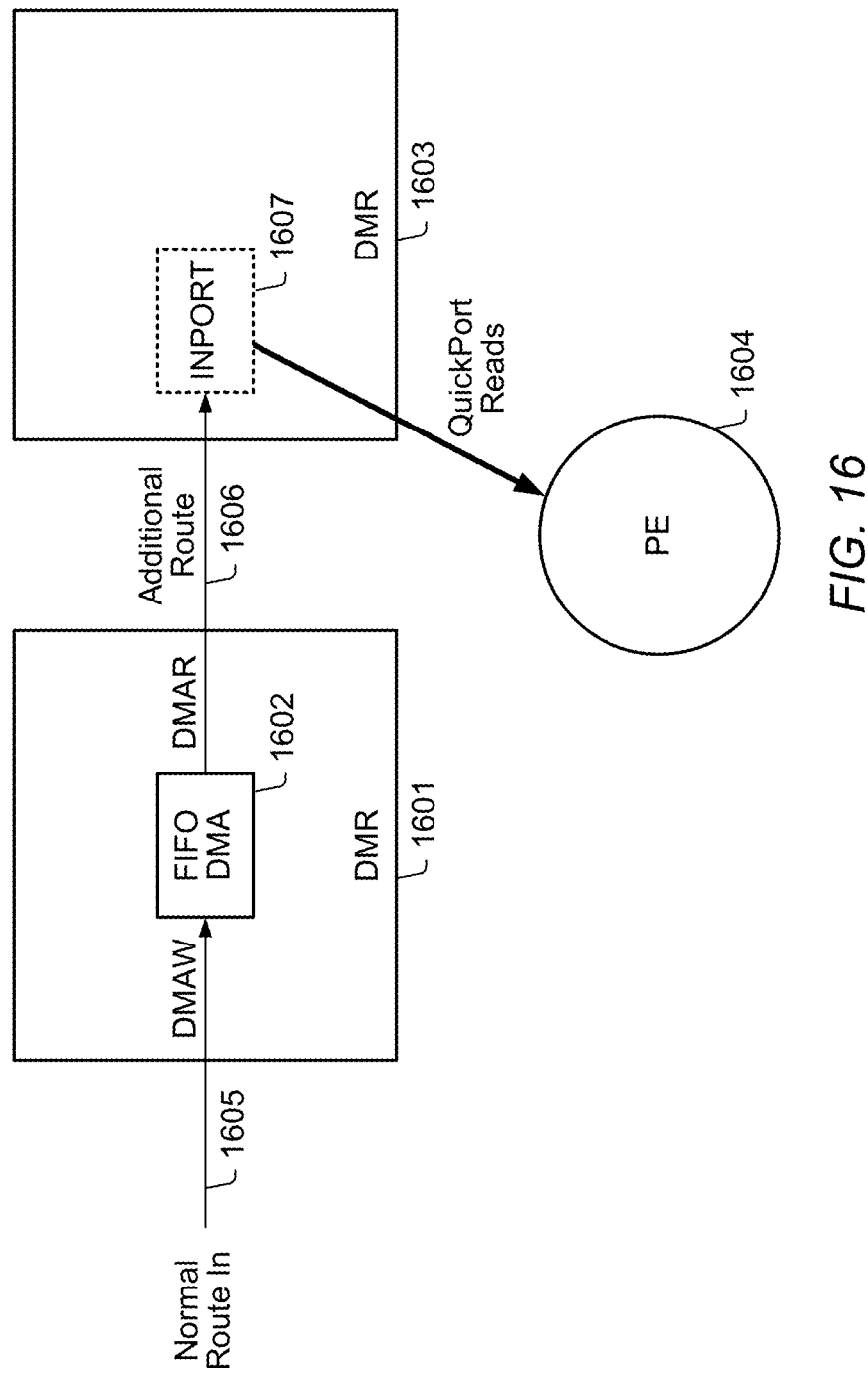
FIG. 16 is block diagram illustration the emulation of a processing engine read FIFO.

Under certain circumstances, it may be desirable for a PE to read and write memory and be tied into a FIFO structure. In some embodiments, this may be realized using an additional DMR and at least some of the functions of the previously described DMA FIFO controller. Turning to FIG. 16, a block diagram of an emulation of a PE read FIFO is illustrated. In the illustrated embodiment, normal route in 1605 is coupled to DMR 1601, which is, in turn, coupled to DMR 1603 via additional route 1606. DMR 1603 is further coupled to PE 1604. In some embodiments, DMR 1601 may include a single-write, single-read FIFO 1602. In this FIG. 1607 is not a DMA-FIFO but is simply an INPORT (input port) on the DMR that is holding the values from the 1606 route link until PE 1604 can read them. The route is stalled until the PE reads a value or the PE is stalled until the next value is available in the port.

During operation, DMA-FIFO 1602 may send received data from normal route in 1605 to DMR 1603 via INPORT 1607. Processing element 1604 may then perform stalling reads on INPORT 1607, resulting in a local copy of the data stored in DMA-FIFO 1602, via DMR 1604. In some embodiments, processing element 1604 may be able to receive the data from DMA-FIFO 1602 with minimal additional latency. It is noted that the embodiment illustrated in FIG. 16 is merely an example. In other embodiments, different numbers and arrangements of DMR blocks and processing elements are possible.

It is possible to insert processing into the transfer path of the fabric interconnection that is programmable in various ways. This processing can exist both for the DMA FIFO mode as well as for normal transfer modes. The simple types of processing include things like bit interleaving and de-interleaving. Other simple processing can include byte swapping, byte packing and unpacking, field masking, arithmetic functions such as add and multiply, etc. More complex functions may also be performed. A useful function for security applications is encryption and decryption. Other computations that might easily be adaptable into the DMA streaming functionality are CRC, Parity, shift, extraction, and filtering. The examples described above are for illustrative purposes only and are not meant to be used to limit the scope of the description.

In many situations there is a need to scan through memory and calculate a signature that depends on all of the bits scanned. The DMA engine already has the means to generate sequences of addresses to scan memory and the addition of modest processing capability makes it straightforward to calculate lengthwise parity, running sums, or running products, to name a few. The output signature may be written to one or more registers that are accessible to application software, so as to use the results in the application.

One use is to rapidly and efficiently compare two or more data arrays to test that they are the same, the method being to calculate a signature for one array and calculate a signature for a second array and then compare signatures. The signature calculation on each array may be done by the same hardware separated in time or by different hardware separated in space and/or time. The same signature calculation hardware need not be used on both arrays, as long as the signature calculation is the same. This allows the signature calculations to be made for example, in different DMRs or different IC chips. The comparison of signatures from one or more signature calculations may be made at a central location or distributed across multiple locations, either in hardware in a DMA or in software executing on PE hardware. In any case the distributed calculation of signatures may require the communication of signature values to a central location or along a distribution of comparison locations. The DMA engine may be configured to issue a message for wormhole routing that delivers the signature value of an array to a destination for comparison. Signature messages may be much much shorter than the data they represent and thus be more efficiently distributed.

Tests for data array equivalence are used for example in the method of triple modular redundancy (TMR) which takes the results from three (possibly erroneous) computations and compares them for equivalence, and if two or more results are equivalent then their result may be accepted as correct. If the results of each computation are already small then the DMA signature calculation will not help, but if the results are more than a few tens of words then the DMA signature calculation may be more efficient than calculating signatures with a PE.

Figure 21:
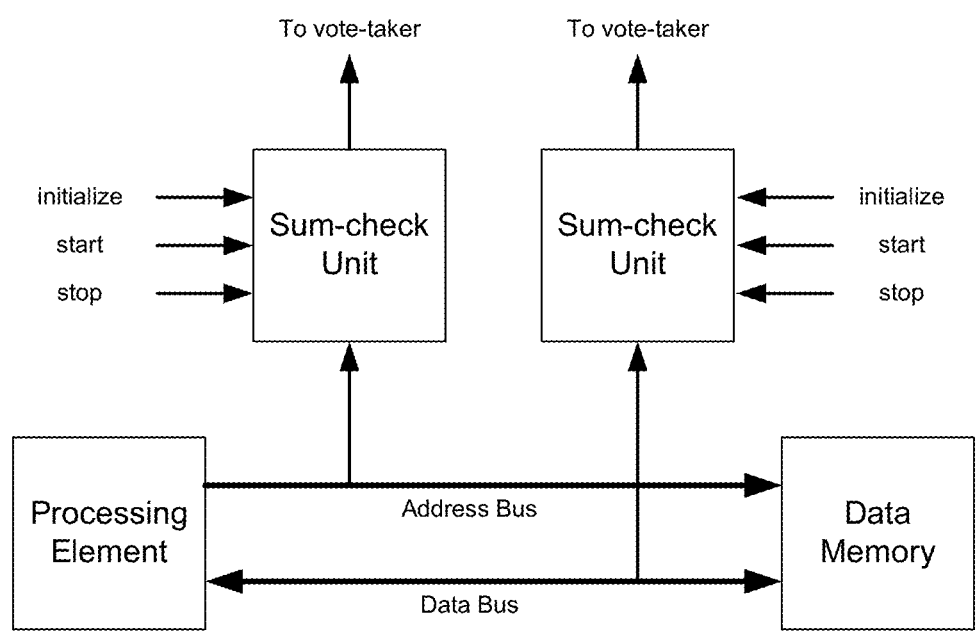
FIG. 21 depicts a block diagram illustrating an example of data checking processing.

The idea of hardware support for signature calculations is not limited to DMA engines, it may also be applied to the address and data streams between a PE and its supporting memory, both data memory (DM) and instruction memory (IM). FIG. 21 shows a possible arrangement of sum-check units tapped into address and data busses between PE and DM. These calculate running sums to calculate signatures, but other arithmetic and logical processing may be implemented. The output of the sum-check units may be sent to a modular redundancy "vote taker" to determine which results to accept.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An apparatus, comprising:
a plurality of processors;
a plurality of communication circuits coupled to the plurality of processors in an interspersed arrangement, wherein each one of the plurality of communication circuits is coupled to a plurality of interconnection networks, wherein a particular communication circuit of the plurality of communication circuits is configured to:
receive, via a particular interconnection network of the plurality of interconnection networks, a message that includes one or more data words and route information;
modify the route information using congestion information to generate an updated message that includes modified route information; and
forward the updated message to another communication circuit of the plurality of communication circuit using the modified route information.

2. The apparatus of claim 1, wherein the particular communication circuit is further configured to receive the congestion information from a different communication circuit of the plurality of communication circuits that is adjacent to the particular communication circuit.

3. The apparatus of claim 2, wherein the congestion information includes local congestion information and global congestion information.

4. The apparatus of claim 3, wherein congestion information includes temporal information indicative of a duration of congestion on a route specified in the route information.

5. The apparatus of claim 4, wherein the particular communication circuit is further configured to modify the route information using the duration of the congestion.

6. The apparatus of claim 1, wherein the particular communication circuit is further configured to forward, using a different interconnection network of the plurality of interconnection networks, the updated message to another communication circuit of the plurality of communication circuit using the modified route information.

7. A method, comprising:
receiving, by a particular communication circuit of a plurality of communication circuits using a particular interconnection network of a plurality of interconnection networks, a message that includes one or more data words and route information, wherein each of the plurality of communication circuits is coupled to the plurality of interconnection networks;
modifying, by the particular communication circuit, the route information using congestion information to generate an updated message that includes modified route information; and
forwarding, by the particular communication circuit, the updated message to another communication circuit of the plurality of communication circuits using the modified route information.

8. The method of claim 7, further comprising, receiving the congestion information from a different communication circuit of the plurality of communication circuits that is adjacent to the particular communication circuit.

9. The method of claim 8, wherein the congestion information includes local congestion information and global congestion information.

10. The method of claim 9, further comprising:
gathering, by a different communication circuit of the plurality of communication circuits, respective information from a subset of the plurality of communication circuits, wherein each communication circuit of the subset of the plurality of communication circuits is adjacent to the different communication circuit; and
generating the global congestion information using the respective information.

11. The method of claim 9, wherein congestion information includes temporal information indicative of a duration of congestion on a route specified in the route information.

12. The method of claim 11, further comprising, modifying, by the particular communication circuit, the route information using the duration of the congestion.

13. The method of claim 7, further comprising, forwarding, by the particular communication circuit using a different interconnection network of the plurality of interconnection networks, the updated message to another communication circuit of the plurality of communication circuit using the modified route information.

14. An apparatus, comprising:
a plurality of layer switch circuits; and
a plurality of direction switch circuits coupled to a plurality of interconnection networks, and wherein a particular direction switch circuit of the plurality of direction switch circuits is configured to:
receive, via a particular interconnection network of the plurality of interconnection networks, a message that includes one or more data words and route information that includes a first plurality of navigation instructions, wherein a given one of the first plurality of navigation instructions includes a direction change instruction, a layer change instruction, or an instruction to maintain a current direction and current layer;
modify the route information using congestion information to generate an updated message that includes modified route information, wherein the modified route information includes a second plurality of navigation instructions different from the first plurality of navigation instructions; and
forward, using one or more layer switch circuits of the plurality of layer switch circuit, the updated message according to a particular navigation instruction included in the second plurality of navigation instructions.

15. The apparatus of claim 14, wherein the particular direction switch circuit is further configured to receive the congestion information from one or more communication circuits of a plurality of communication circuits coupled to the plurality of interconnection networks.

16. The apparatus of claim 15, wherein the congestion information includes local congestion information and global congestion information.

17. The apparatus of claim 16, wherein congestion information includes temporal information indicative of a duration of congestion on a route specified in the route information.

18. The apparatus of claim 17, wherein the particular direction switch circuit is further configured to modify the route information using the duration of the congestion.

19. The apparatus of claim 14, wherein the particular direction switch circuit is further configured to forward, using the particular interconnection network of the plurality of interconnection networks, the updated message according to one or more changes in direction specified in the modified route information.

20. The apparatus of claim 14, wherein to modify the route information using congestion information, the particular direction switch circuit is further configured to:
add one or more new navigation instructions to the first plurality of navigation instructions to generate the second plurality of navigation instructions, wherein the one or more new navigation instructions includes a change in direction instruction, a change in layer instruction, or a straight-ahead instruction; and
remove one or more existing navigation instructions from the first plurality of navigation instructions to generate the second plurality of navigation instructions.

* * * * *